United States Patent
Llorca et al.

(10) Patent No.: US 10,218,776 B2
(45) Date of Patent: Feb. 26, 2019

(54) DISTRIBUTION OF CLOUD SERVICES IN A CLOUD ENVIRONMENT

(71) Applicants: Jaime Llorca, Red Bank, NJ (US); Antonia Tulino, Holmdel, NJ (US)

(72) Inventors: Jaime Llorca, Red Bank, NJ (US); Antonia Tulino, Holmdel, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 351 days.

(21) Appl. No.: 14/670,823

(22) Filed: Mar. 27, 2015

(65) Prior Publication Data

US 2016/0105489 A1 Apr. 14, 2016

Related U.S. Application Data

(60) Provisional application No. 62/063,777, filed on Oct. 14, 2014.

(51) Int. Cl.
| | |
|---|---|
| *H04L 29/08* | (2006.01) |
| *G06F 9/455* | (2018.01) |
| *G06F 9/50* | (2006.01) |
| *H04L 12/923* | (2013.01) |

(Continued)

(52) U.S. Cl.
CPC .......... *H04L 67/10* (2013.01); *G06F 9/45558* (2013.01); *G06F 9/50* (2013.01); *H04L 47/762* (2013.01); *H04L 67/04* (2013.01); *H04L 67/16* (2013.01); *H04W 4/005* (2013.01);

(Continued)

(58) Field of Classification Search
None
See application file for complete search history.

(56) References Cited

U.S. PATENT DOCUMENTS

| | | | |
|---|---|---|---|
| 7,185,077 B1 * | 2/2007 | O'Toole | H04L 12/185 370/254 |
| 7,924,718 B2 | 4/2011 | Feng et al. | |
| 8,411,624 B2 | 4/2013 | Stolyar et al. | |

(Continued)

OTHER PUBLICATIONS

Alcatel Lucent, "Metro Network Traffic Growth: An Architecture Impact Study," Bell Labs Strategic White Paper, Dec. 3, 2013.

(Continued)

*Primary Examiner* — Patrice L Winder
(74) *Attorney, Agent, or Firm* — Tong, Rea, Bentley & Kim, LLC

(57) ABSTRACT

A capability for determining a distribution of a cloud service within a cloud environment is presented. The distribution of the cloud service within the cloud environment may specify a placement of information objects and cloud service virtual functions of the cloud service within the cloud environment. The distribution of the cloud service within the cloud environment may be determined based on a graph-based representation of the cloud service in which nodes of the graph represent the information objects of the cloud service and edges between the nodes of the graph represent the cloud service virtual functions of the cloud service and based on a graph-based representation of the cloud environment in which nodes of the graph represent locations or elements of the cloud environment and edges between the nodes of the graph represent the interconnections between the locations or elements of the cloud environment.

18 Claims, 14 Drawing Sheets

(51) Int. Cl.
*H04W 4/70* (2018.01)
*H04W 4/00* (2018.01)

(52) U.S. Cl.
CPC ..... *H04W 4/70* (2018.02); *G06F 2009/45562* (2013.01); *G06F 2009/45575* (2013.01)

(56) References Cited

U.S. PATENT DOCUMENTS

| | | | |
|---|---|---|---|
| 8,856,386 B2* | 10/2014 | Dutta | H04L 41/0883 370/225 |
| 9,171,102 B1* | 10/2015 | Zlatnik | G06F 17/30958 |
| 9,286,134 B2 | 3/2016 | Guo et al. | |
| 9,337,931 B2* | 5/2016 | Srinivas | H04B 10/27 |
| 9,557,879 B1* | 1/2017 | Wang | G06F 3/0481 |
| 9,619,772 B1* | 4/2017 | Adogla | G06Q 10/0635 |
| 9,755,987 B2* | 9/2017 | Wheeler | H04L 47/70 |
| 2003/0009560 A1 | 1/2003 | Venkitaraman et al. | |
| 2008/0123559 A1* | 5/2008 | Haviv | H04L 41/00 370/255 |
| 2008/0225751 A1* | 9/2008 | Kozat | H04L 12/1881 370/254 |
| 2008/0300851 A1* | 12/2008 | Chakrabarti | G06F 8/433 703/22 |
| 2012/0203888 A1* | 8/2012 | Balakrishnan | G06F 9/505 709/224 |
| 2012/0303670 A1* | 11/2012 | Gillen | G06F 9/5072 707/797 |
| 2013/0204997 A1* | 8/2013 | Eggleston | H04L 41/00 709/223 |
| 2013/0227338 A1* | 8/2013 | Lingafelt | H04L 41/0654 714/4.5 |
| 2014/0059178 A1* | 2/2014 | Dutta | H04L 41/0883 709/219 |
| 2014/0067758 A1* | 3/2014 | Boldyrev | H04L 67/1097 707/610 |
| 2014/0098673 A1* | 4/2014 | Lee | H04L 45/64 370/238 |
| 2014/0258535 A1* | 9/2014 | Zhang | H04L 41/0806 709/226 |
| 2015/0117216 A1* | 4/2015 | Anand | H04L 47/125 370/236 |
| 2015/0222564 A1* | 8/2015 | Wheeler | H04L 47/70 709/226 |
| 2015/0288569 A1* | 10/2015 | Agarwal | H04L 41/12 709/224 |
| 2015/0370870 A1* | 12/2015 | Caruana | H04L 67/1097 707/602 |
| 2016/0004759 A1* | 1/2016 | Ramakrishnan | G06F 3/048 715/753 |
| 2016/0188767 A1* | 6/2016 | Razin | G06F 17/509 703/13 |
| 2016/0234073 A1* | 8/2016 | Maes | H04L 41/12 |

OTHER PUBLICATIONS

Weldon, "Defining the Future of Networks," CommsDay Summit 2014, Apr. 2014.
Alcatel Lucent, "The Programmable Cloud Network—A Primer on SDN and NFV," Alcatel-Lucent Strategic White Paper, Jun. 2013.
Broberg et al., "MetaCDN: Harnessing Storage Clouds for High Performance Content Delivery," Journal of Network and Computer Applications, vol. 32, Issue 5, Sep. 1, 2009.
Srinivasan et al., "ActiveCDN: Cloud Computing Meets Content Delivery Networks," Columbia University Computer Science Technical Reports, 2011.
Jin et al., "CoDaaS: An Experimental Cloud-Centric Content Delivery Platform for User-Generated Contents," International Conference on Computing, Networking, and Communications (ICNC), Maui, Hawaii, Jan. 30, 2012.
Krishnan et al., "The Cache Location Problem," IEEE/ACM Trans. on Networking, vol. 8, No. 5, pp. 568-582, Oct. 2000.
Baev et al., "Approximation Algorithms for Data Placement Problems," SIAM Journal on Computing, vol. 38, Issue 4, pp. 1411-1429, Jul. 1, 2008.
Breslau et al., "Web Caching and Zipf-like Distributions: Evidence and Implications," IEEE, INFOCOM '99, pp. 126-134, Mar. 21, 1999.
Ahmadian et al., "Improved Approximation Guarantees for Lower-Bounded Facility Location," Cornell University Library, CSarXiV, Aug. 29, 2012.
Cha et al., "Watching Television over an IP Network," ACM Internet Measurement Conference 2008 (IMC '08), Vouliagmeni, Greece, Oct. 20, 2008.
Qiu, Xuanjia, et al., "Cost-Minimizing Dynamic Migration of content Distribution Services into Hybrid Clouds," IEEE Transactions on Parallel and Distributed Systems, vol. pp. No. 99, 2015, 14 pages.
Han, Vijay Gopalakrishnan, et al., "Network Functions Virtualization: Challenges and Opportunities for Innovations," ETSI, White Paper, Oct. 2012, 8 pages.
Open Networking Foundation, "Software-Defined Networking: The New Norm for Networks," ONF White Paper, Apr. 13, 2012, 12 pages.
Cohen, Rami, et al., "Near Optimal Placement of Virtual Network Functions," IEEE INFOCOM, Apr. 2015, 9 pages.
Barcelo, Marc et al., "The Cloud Service Distribution Problem in Distributed Cloud Networks," IEEE ICC 2015 SAC Data Storage and Cloud Computing, Jun. 2015, 7 pages.
Garg, Naveen et al., "Faster and Simpler Algorithms for Multicommodity Flow and other Fractional Packing Problems," 39$^{th}$ Annual Symposium on Foundations of Computer Science, Nov. 8-11, 1998, 10 pages.
Cao, Zizhong, et al., "Traffic Steering in Software Defined Networks: Planning and Online Routing," ACM SIGCOMM Computer Communication Review, vol. 44, No. 4, Aug. 2014, 6 pages.
Crainic, Teodor Gabriel, et al., "Bundle-based relaxation methods for multicommodity capacitated fixed charge network design," Discrete Applied Mathematics, vol. 112, 2001, pp. 73-99.
Dragoni, Nicola, et al., "Microservices: yesterday, today, and tomorrow," Version 1, arxiv, Jun. 2016, 17 pages.
Supittayapornpong, Sucha, et al., "Time-Average Stochastic Optimization with Non-convex Decision Set and its Convergence," IEEE CDC, Dec. 2014, 11 pages.
Tseng, Paul, "On Accelerated Proximal Gradient Methods for Convex-Concave Optimization," SIAM Journal on Optimization, May 2008, 20 pages.
Liu, Jia, et al., "Heavy-Ball: A New Approach to Tame Delay and Convergence in Wireless Network Optimization," IEEEE INFOCOM, Apr. 2016, 9 pages.
Feng, H. et al., "Dynamic Network Service Optimization in Distributed Cloud Networks," 2016 IEEE Conference on Computer Communication Workshops (INFOCOM WKSHPS), San Francisco, CA, Apr. 10-14, 2016, 6 pages.
Bertsekas, Dimitri P., "Convex Optimization Theory," Athena Scientific, 2009, 57 pages.
Bienstock, D. et al., "Faster approximation algorithms for packing and covering problems," STOC'04, Aug. 13, 2004.
Feng, et al., "Optimal Dynamic Cloud Network Control," 2016 IEEE International Conference on Communications, May 22, 2016, 7 pages.

\* cited by examiner

DISTRIBUTION OF CLOUD SERVICES IN A CLOUD ENVIRONMENT

CROSS-REFERENCE TO RELATED APPLICATIONS

This application claims the benefit of U.S. Provisional Patent Application Ser. No. 62/063,777, filed on Oct. 14, 2014, entitled "Distribution of Cloud Services in a Cloud Environment," which is hereby incorporated herein by reference.

TECHNICAL FIELD

The disclosure relates generally to cloud environments and, more specifically but not exclusively, to distribution of cloud services in cloud environments.

BACKGROUND

It is expected that Internet traffic may soon be dominated by the consumption of resource-intensive and interaction-intensive cloud services (e.g., augmented reality, immersive video, real-time computer vision, tactile internet, and so forth) from increasing numbers of resource-limited communication end points (e.g., phones, tablets, wearable devices, Internet-of-Things (IoT) devices, and so forth). It is also expected that both end user experience and overall network efficiency considerations will drive a transformation of existing network and cloud architectures in order to support the consumption of resource-intensive and interaction-intensive cloud services from the increasing numbers of resource-limited communication end points.

SUMMARY OF SOME EMBODIMENTS

Various deficiencies in the prior art may be addressed by embodiments for determining a distribution of a cloud service in a cloud environment.

In at least some embodiments, an apparatus includes a processor and a memory communicatively connected to the processor, wherein the processor is configured to determine a graph-based representation of a cloud service, determine a graph-based representation of a cloud environment, and determine a mapping of the cloud service to the cloud environment based on the graph-based representation of the cloud service and the graph-based representation of the cloud environment. In at least some embodiments, a corresponding method may be provided. In at least some embodiments, a corresponding non-transitory computer-readable storage medium stores instructions which, when executed by a computer, cause the computer to perform a corresponding method.

In at least some embodiments, an apparatus includes a processor and a memory communicatively connected to the processor, wherein the processor is configured to determine a representation of a cloud service, determine a representation of a cloud environment, and determine a mapping of the cloud service to the cloud environment based on the representation of the cloud service and the representation of the cloud environment. In at least some embodiments, a corresponding method may be provided. In at least some embodiments, a corresponding non-transitory computer-readable storage medium stores instructions which, when executed by a computer, cause the computer to perform a corresponding method.

In at least some embodiments, an apparatus includes a processor and a memory communicatively connected to the processor, wherein the processor is configured to determine a representation of a cloud service and determine a mapping of the cloud service to a cloud environment based on the representation of the cloud service. In at least some embodiments, a corresponding method may be provided. In at least some embodiments, a corresponding non-transitory computer-readable storage medium stores instructions which, when executed by a computer, cause the computer to perform a corresponding method.

In at least some embodiments, an apparatus includes a processor and a memory communicatively connected to the processor, wherein the processor is configured to determine a cloud service, determine a representation of a cloud environment, and determine a mapping of the cloud service to the cloud environment based on the representation of the cloud environment. In at least some embodiments, a corresponding method may be provided. In at least some embodiments, a corresponding non-transitory computer-readable storage medium stores instructions which, when executed by a computer, cause the computer to perform a corresponding method.

In at least some embodiments, an apparatus includes a processor and a memory communicatively connected to the processor, wherein the processor is configured to determine a set of cloud service virtual functions for a cloud service, determine a set of information objects for the cloud service, and determine a graph-based representation of the cloud service based on the set of cloud service virtual functions for the cloud service and the set of information objects for the cloud service. In at least some embodiments, a corresponding method may be provided. In at least some embodiments, a corresponding non-transitory computer-readable storage medium stores instructions which, when executed by a computer, cause the computer to perform a corresponding method.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements common to the figures.

DETAILED DESCRIPTION OF SOME EMBODIMENTS

Figure 1:
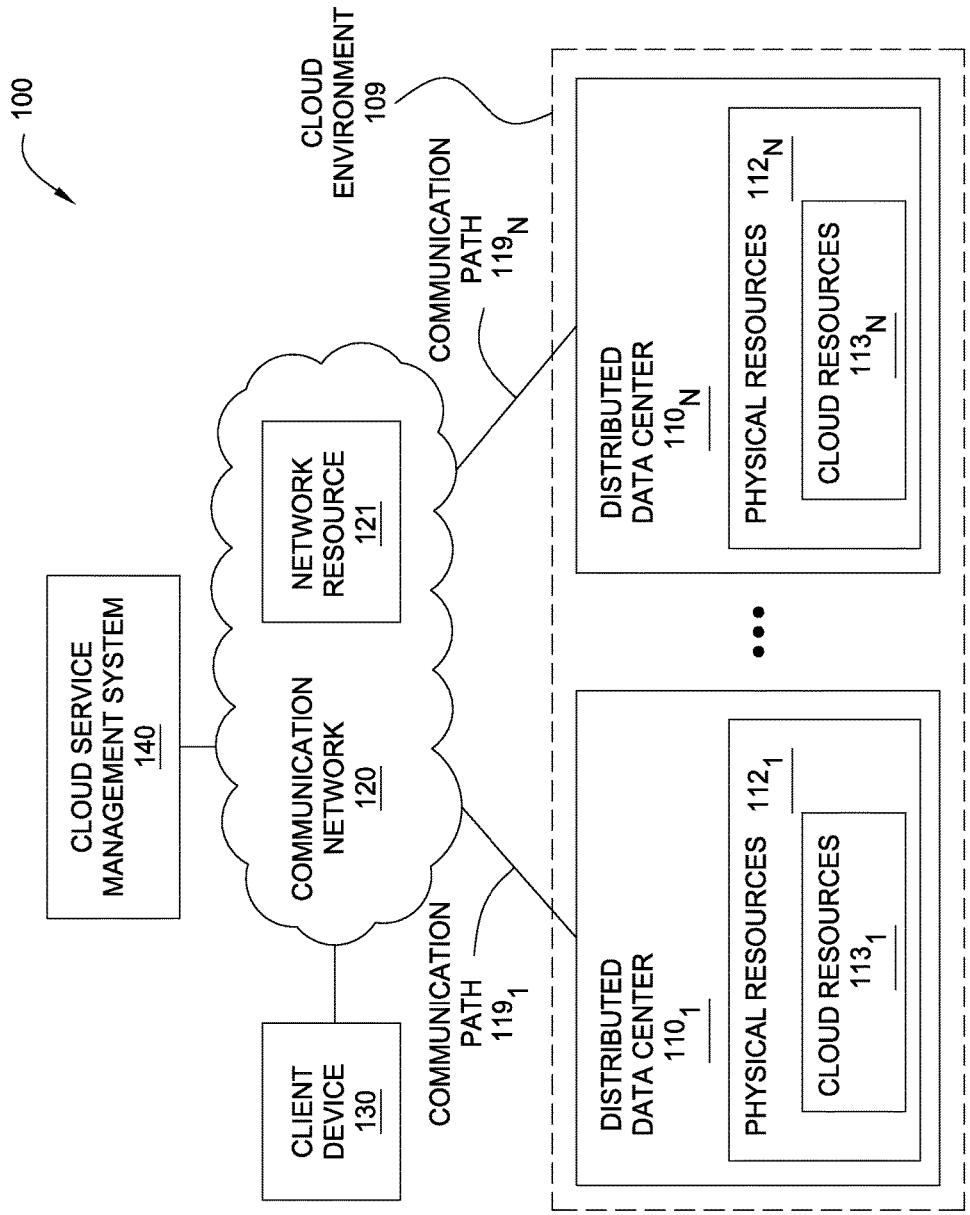
FIG. 1 depicts an exemplary distributed cloud system including a distributed cloud environment and a controller configured to control distribution of cloud services within the distributed cloud environment.

In general, a capability for determining a distribution of a cloud service within a cloud environment is presented. The capability for determining a distribution of a cloud service within a cloud environment may support mapping of the cloud service to the cloud environment (e.g., to physical resources of the cloud environment, to virtual resources of the cloud environment, or the like, as well as various combinations thereof). The distribution of the cloud service within the cloud environment may specify a placement of information objects of the cloud service within the cloud environment and a placement of cloud service virtual functions of the cloud service within the cloud environment. The distribution of the cloud service within the cloud environment may be determined based on a representation of the cloud service. The distribution of the cloud service within the cloud environment may be determined based on a graph-based representation of the cloud service in which nodes of the graph represent the information objects of the cloud service and edges between the nodes of the graph represent the cloud service virtual functions of the cloud service. The distribution of the cloud service within the cloud environment may be determined based on a representation of the cloud environment. The distribution of the cloud service within the cloud environment may be determined based on a graph-based representation of the cloud environment in which nodes of the graph represent locations or elements of the cloud environment and edges between the nodes of the graph represent the interconnections between the locations or elements of the cloud environment. The distribution of the cloud service within the cloud environment may be determined by determining a representation of the cloud service, determining a representation of the cloud environment, and determining a mapping of the cloud service to the cloud environment based on the representation of the cloud service and the representation of the cloud environment. The distribution of the cloud service within the cloud environment may be determined responsive to a request for the cloud service. The distribution of the cloud service within the cloud environment may specify a placement of the information objects of the cloud service within the cloud environment and a placement of the cloud service virtual functions of the cloud service within the cloud environment. The distribution of the cloud service within the cloud environment may specify interconnections between cloud service virtual functions, which may represent one or more of the paths that information objects follow between the cloud service virtual functions, network resources supporting communications of information objects between cloud service virtual functions (e.g., virtual links, bandwidth, or the like), or the like, as well as various combinations thereof. The distribution of the cloud service within the cloud environment may be determined such that user demands are satisfied with guaranteed user quality of experience (QoE) and minimum overall network cost. The capability for determining a distribution of a cloud service within a cloud environment may support deployment of the cloud service within the cloud environment. The cloud environment may be a distributed cloud environment (e.g., multiple data center locations), a centralized cloud environment (e.g., a single data center where elements of the cloud service may be distributed within the data center), or any other suitable type of cloud environment. These and various other embodiments are discussed further below.

Various embodiments of the capability for distribution of a cloud service within a cloud environment may support improvement or even optimization of various aspects related to the operation and dimensioning of a heterogeneous pool of resources (e.g., compute resources, storage resources, transport resources, or the like).

Various embodiments of the capability for distribution of a cloud service within a cloud environment may enable improved support for consumption of resource-intensive and interaction-intensive cloud services (e.g., augmented reality, immersive video, real-time computer vision, tactile internet, or the like) from increasing numbers of resource-limited communication end points (e.g., phones, tablets, wearable devices, Internet-of-Things (IoT) devices, or the like).

Various embodiments of the capability for distribution of a cloud service within a cloud environment may enable improved support for consumption of resource-intensive and interaction-intensive cloud services from increasing numbers of resource-limited communication end points while also maintaining or even improving one or more of user experience, overall network efficiency, or the like, as well as various combinations thereof.

Various embodiments of the capability for distribution of a cloud service within a cloud environment may enable improved support for consumption of resource-intensive and interaction-intensive cloud services from increasing numbers of resource-limited communication end points by supporting or even facilitating a fundamental transformation from existing architectures (e.g., highly centralized network and cloud architectures) toward new architectures (e.g., a highly-distributed converged network-cloud platform, which may be composed of a relatively large number of distributed cloud locations at the network edge interconnected by a highly meshed converged core, such as a metro-core or any other suitable type of core) better suited to support consumption of resource-intensive and interaction-intensive cloud services.

Various embodiments of the capability for distribution of a cloud service within a cloud environment may enable improved support for consumption of resource-intensive and interaction-intensive cloud services from increasing numbers of resource-limited communication end points by utilizing network function virtualization (NFV) and software defined networking (SDN) in order to instantiate a cloud service in the form of a set of virtual functions over a programmable networked cloud infrastructure (which may include a rich variety of cloud locations, ranging from large centralized national-scale data centers all the way down to highly distributed micro data centers at the network edge).

Various embodiments of the capability for distribution of a cloud service within a cloud environment may be particularly useful or valuable for cloud services having relatively stringent requirements (e.g., latency requirements, bandwidth requirements, or the like, as well as various combinations thereof), and the value may increase with associated increases in the stringency of the requirement(s).

Various embodiments of the capability for distribution of a cloud service within a cloud environment provide a formal model for a general cloud service (e.g., an existing cloud service, a next-generation cloud service, or the like) in which the final information delivered to the user is the output of multiple functions running in a distributed networked cloud and taking as input multiple information sources from possibly multiple locations.

Various embodiments of the capability for distribution of a cloud service within a cloud environment may support (1) modeling of a general cloud service in which the end user requests information that is the output of possibly multiple cloud service functions that take as input possibly multiple source information originating at possibly multiple locations, (2) determining a mapping of cloud service virtual functions of a cloud service within the cloud environment such that end user QoE is satisfied with minimum overall use of network resources, and (3) determining the optimal dimensioning of the physical resources (e.g., compute, storage, transport, or the like, as well as various combinations thereof) of the distributed networked cloud such that QoE for the cloud service hosted by the distributed networked cloud is satisfied with minimum overall capital and operational expenses.

Various embodiments of the capability for distribution of a cloud service within a cloud environment may support formalization of a general cloud service distribution problem in distributed networked clouds (e.g., formalized as the problem that finds the optimal allocation of cloud service functions, plus an optimal dimensioning of network resources, such that service requirements are satisfied with minimum overall network cost) and determination of an optimal solution for the general cloud service distribution problem (e.g., by solving a minimum cost flow problem in the form of a linear program, at least some embodiments of which are discussed further below. In at least some embodiments, determination of an optimal solution for the general cloud service distribution problem includes determining a representation of a cloud service and computing the optimal solution to the cloud service distribution problem for the cloud service as a minimum cost flow problem based on the representation of the cloud service. The representation of the cloud service may be an efficient mathematical representation of the cloud service. The representation of the cloud service may be provided as a formal model of the cloud service. In the model of the cloud service, the cloud service may be characterized by a rooted directed graph called the service graph, in which a node in the service graph represents an information object required for that cloud service. For example, a leaf node of the service graph represents an information object that is an input to the cloud service and the root node of the service graph represents the final information object that needs to be delivered as an output of the cloud service (e.g., the combined video resulting from combining video content with additional image-based content in an augmented reality service, the combined video resulting from combining multiple source video streams in an immersive video service, acquiring multiple image-based content items and analyzing the multiple image-based content items to produce associated symbolic information in a real-time computer vision service, or the like). In the model, an information object o is characterized by a function $p\_o$ that requires the set of input objects $Z(o)$ to generate information object o, and the information object o may be represented in the service graph by creating directed edges from the objects in $Z(o)$ to information object o. For example, information objects may include audio content, image content, video content, multimedia content, text-based content, a software program, or any other suitable types of information objects. It will be appreciated that the types of information objects may vary for different types of cloud services. It is noted that (1) the final information object, represented as the root of the service graph, has no outgoing links, because it is not the input to any other information object for that service and (2) the leaves of the rooted service graph have no incoming links, because they represent source information that does not need to be created by the cloud service (e.g., by a cloud service function of the cloud service). In other words, the service graph for the cloud service encodes relationships between (1) the information objects necessary to deliver the final output of the cloud service (represented by the nodes of the service graph) and (2) the associated cloud service virtual functions configured to process information objects of the cloud service in order to produce other information objects of the cloud service (represented by the links or edges between nodes of the service graph). In general, a cloud service virtual function may be configured to process one or more input information objects to produce one or more output information objects. The types of functions supported by the cloud service virtual functions may depend on one or more factors, such as the type of cloud service, the types of information objects of the cloud service, or the like, as well as various combinations thereof. For example, cloud service virtual functions may include an audio processing function, an image processing function, a video processing function, a multimedia processing function, a text processing function, an encoding function, a decoding function, an encryption function, a decryption function, a content combining function, a content splitting function, a content modification function, a data processing function, or any other suitable types of functions which may be supported by resources of a cloud environment and which may be used for implementing a cloud service. The computation of the optimal solution to the cloud service distribution problem for the cloud service as a minimum cost flow problem may be performed based on the representation of cloud service (e.g., based on the service graph for the cloud service). The computation of the optimal solution to the cloud service distribution problem for the cloud service as a minimum cost flow problem based on the representation of cloud service may be performed using only linear constraints (e.g., it is the service graph for the cloud service that enables the optimal solution to the cloud service distribution problem for the cloud service to be computed as a minimum cost flow problem using only linear constraints). These and various other embodiments and advantages of the capability for distribution of a cloud service within a cloud environment may be further understood when considered within the context of an exemplary distributed cloud system as depicted in FIG. 1.

FIG. 1 depicts an exemplary distributed cloud system including a distributed cloud environment and a controller configured to control distribution of cloud services within the distributed cloud environment.

The distributed cloud system (DCS) 100 includes a distributed cloud environment 109 having a set of distributed data centers (DDCs) 110$_1$-110$_N$ (collectively, DDCs 110), a communication network (CN) 120, a client device (CD) 130, and a cloud service management system (CSMS) 140.

The DDCs 110 may be configured to support cloud services for cloud consumers. The cloud services may include cloud computing services, Infrastructure as a Service (IaaS), or the like. For example, the cloud services may include augmented reality services, immersive video services, real-time computer vision services, tactile internet services, network virtualization services (e.g., for one or more of routing, data flow processing, charging, or the like, as well as various combinations thereof), or the like. The DDCs 110 may include various types and configurations of resources, which may be used to support cloud services for cloud consumers. The resources may include various types and configurations of physical resources, which may be used to support various types and configurations of virtual resources. The DDCs $110_1$-$110_D$ may communicate with CN 120 via communication paths $119_1$-$119_D$ (collectively, communication paths 119), respectively.

The DDCs 110 include respective sets of physical resources (PRs) $112_1$-$112_D$ (collectively, PRs 112) which may be used to provide cloud services for cloud consumers. For example, PRs 112 of a DDC 110 may include computing resources, memory resources, storage resources, input-output (I/O) resources, networking resources, or the like. For example, PRs 112 of a DDC 110 may include servers, processor cores, memory devices, storage devices, networking devices (e.g., switches, routers, or the like), communication links, or the like, as well as various combinations thereof. For example, PRs 112 of a DDC 110 may include host servers configured to host virtual resources within the DDC 110 (e.g., including server blades organized in racks and connected via respective top-of-rack (TOR) switches, hypervisors, or the like), aggregating switches and routers configured to support communications of host servers within the DDC 110 (e.g., between host servers within the DDC 110, between host servers of the DDC 110 and devices located outside of the DDC 110, or the like), or the like, as well as various combinations thereof. The typical configuration and operation of PRs of a datacenter (e.g., such as PRs 112 of one or more of the DDCs 110) will be understood by one skilled in the art.

The PRs 112 of the DDCs 110 may be configured to support respective sets of cloud resources (CRs) $113_1$-$113_D$ (collectively, CRs 113) for cloud consumers. For example, CRs 113 supported using PRs 112 of a DDC 110 may include virtual computing resources, virtual memory resources, virtual storage resources, virtual networking resources (e.g., bandwidth), or the like, as well as various combinations thereof. The CRs 113 supported using PRs 112 of a DDC 110 may be provided in the form of virtual machines (VMs), virtual applications, virtual application instances, virtual file systems, or the like, as well as various combinations thereof. The allocation of CRs 113 of DDCs 110 may be performed by CSMS 140 responsive to requests for cloud services from cloud consumers (e.g., a request for a cloud service received from client device 130 or any other suitable source of such a request). It will be appreciated that the typical configuration and operation of VRs using PRs of a datacenter (e.g., such as configuration and operation of CRs 113 using PRs 112 of one or more of the DDCs 110) will be understood by one skilled in the art.

The DDCs 110 of cloud environment 109 may be arranged in various ways. The DDCs 110 (or at least a portion of the DDCs 110) may be distributed geographically. The DDCs 110 may be located at any suitable geographic locations. The DDCs 110 may be distributed across a geographic area of any suitable size (e.g., globally, on a particular continent, within a particular country, within a particular portion of a country, or the like). The DDCs 110 (or at least a portion of the DDCs 110) may be located relatively close to the end users. The DDCs 110 (or at least a portion of the DDCs 110) may be arranged hierarchically (e.g., with larger DDCs 110 having larger amounts of PRs 112 and CRs 113 being arranged closer to the top of the hierarchy (e.g., closer to a core network supporting communications by the larger DDCs 110) and smaller DDCs 110 having smaller amounts of PRs 112 and CRs 113 being arranged closer to the bottom of the hierarchy (e.g., closer to the end users). The DDCs 110 may be provided at existing locations (e.g., where the cloud provider may be a network service provider, at least a portion of the DDCs 110 may be implemented within Central Offices (COs) of the network service provider since, as traditional telecommunications equipment deployed in the COs has become more compact, real estate has become available at the COs and may be used for deployment of servers configured to operate as part of a distributed cloud system and, further, because such COs generally tend to be highly networked such that they may be configured to support the additional traffic associated with a distributed cloud system), standalone locations, or the like, as well as various combinations thereof. It will be appreciated that, although primarily presented with respect to an arrangement in which each of the DDCs 110 communicates via CN 120, communication between DDCs 110 may be provided in various other ways (e.g., via various communication networks or communication paths which may be available between DDCs 110). The DDCs 110 of cloud environment 109 may be arranged in various other ways.

The CN 120 may include any communication network(s) suitable for supporting communications within DCS 100 (e.g., between DDCs 110, between CD 130 and DDCs 110, between CD 130 and CSMS 140, between CSMS 140 and DDCs 110, or the like). For example, CN 120 may include one or more wireline networks or one or more wireless networks, which may include one or more of a Global System for Mobile (GSM) based network, a Code Divisional Multiple Access (CDMA) based network, a Long Term Evolution (LTE) based network, a Local Area Network (LAN), a Wireless Local Area Network(s) (WLAN), a Metropolitan Area Network (MAN), a Wide Area Network (WAN), or the like. The CN 120 includes network resources 121 that may be configured to support communications within DCS 100, including support for communications associated with access and use of CRs 113 of DDCs 110 (e.g., between DDCs 110, between CD 130 and DDCs 110, or the like). For example, network resources 121 may include network elements (e.g., data routing devices, control functions, or the like), communication links, or the like, as well as various combinations thereof.

The CD 130 is a client device configured to function within DCS 100. For example, CD 130 may be configured to communicate with CSMS 140 for purposes of requesting cloud services supported by cloud environment 109. For example, CD 130 may be configured to communicate with DDCs 110 for purposes of accessing and using virtual resources allocated for CD 130 within DDCs 110 responsive to requests for cloud services supported by cloud environment 109. For example, CD 130 may be a thin client, a smartphone, a tablet computer, a laptop computer, a desktop computer, a television set-top-box, a media player, a gateway, a server, a network device, or the like.

The CSMS 140 may be configured to receive a cloud service request for CD 130 (e.g., from CD 130 or from a device that is requesting the cloud service on behalf of CD 130), determine a cloud resource allocation in response to the cloud service request for CD 130, and configure cloud environment 109 to support the cloud service requested for CD 130 (e.g., allocation of CRs 113 within DDCs 110 and, optionally, allocation of network resources 121 of CN 120). An exemplary embodiment of a method by which CSMS 140 may provide such functions is presented with respect to FIG. 2. The CSMS 140 may be configured to perform various other functions of the capability for distribution of a cloud service within a cloud environment.

Figure 2:
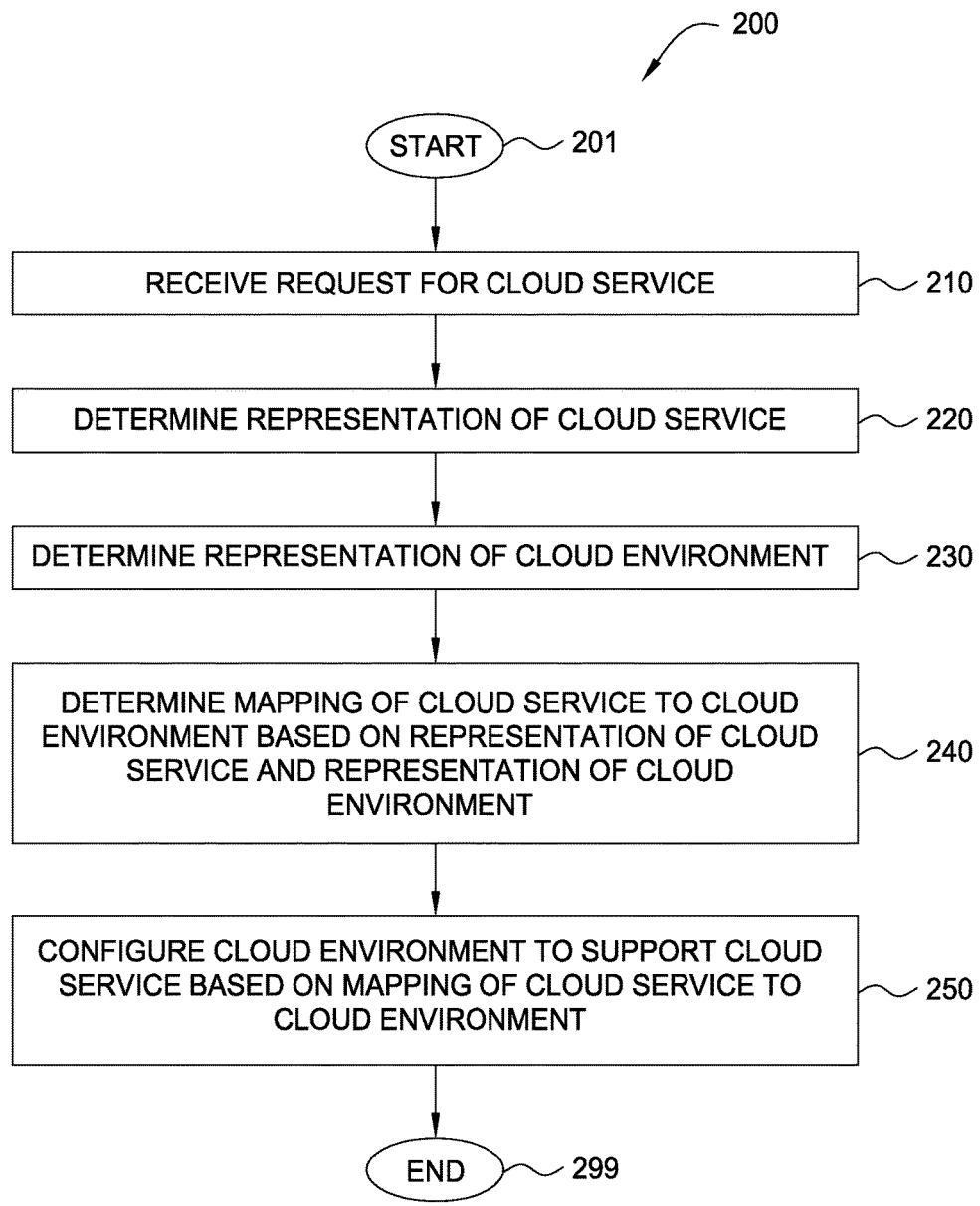
FIG. 2 depicts an exemplary embodiment of a method for configuring a cloud environment to support a cloud service.

FIG. 2 depicts an exemplary embodiment of a method for configuring a cloud environment to support a cloud service. It will be appreciated that, although primarily depicted and described as being performed serially, at least a portion of the steps of method 200 may be performed contemporaneously or in a different order than as depicted in FIG. 2.

At step 201, method 200 begins.

At step 210, a request for a cloud service is received. The request identifies the cloud service requested. The request may be received from any other suitable source of the request. The request may identify one or more input information objects which are inputs to the cloud service. The request may include one or more service requirements for the cloud service (e.g., latency, bandwidth, quality level (e.g., video quality), or the like, as well as various combinations thereof).

At step 220, a representation of the cloud service is determined. The representation of the cloud service may be retrieved (e.g., if previously computed), computed on the fly, or the like. The representation of the cloud service is determined based on input information of the cloud service (e.g., included in the request for the cloud service, determined based on an identification of the cloud service requested, or the like) and a set of cloud service virtual functions of the cloud service where the cloud service virtual functions of the cloud service configured to manipulate information of the cloud service in order to produce the output information of the cloud service from the input information of the cloud service. The representation of the cloud service may be a graph-based representation of the cloud service. In the graph-based representation of the cloud service, an information object o is characterized by a function p_o that requires the set of input objects Z(o) to generate information object o, and the information object o may be represented in the graph-based representation of the cloud service by creating directed edges from the objects in Z(o) to information object o. It is noted that (1) the final information object, represented as the root of the graph-based representation of the cloud service, has no outgoing links, because it is not the input to any other information object for that service and (2) the leaves of the graph-based representation of the cloud service have no incoming links, because they represent source information that does not need to be created by the cloud service (e.g., by a cloud service virtual function of the cloud service). In general, a cloud service virtual function may be represented by a set of edges, which may include one or more edges. In other words, the graph-based representation of the cloud service for the cloud service encodes relationships between (1) the information objects necessary to deliver the final output of the cloud service (represented by the nodes of the graph-based representation of the cloud service) and (2) the associated cloud service virtual functions configured to process information objects of the cloud service in order to produce other information objects of the cloud service (represented by the links or edges between nodes of the graph-based representation of the cloud service).

At step 230, a representation of the cloud environment is determined. The representation of the cloud environment may be retrieved (e.g., if previously computed), computed on the fly, or the like. The representation of the cloud environment specifies the locations of resources of the cloud environment (e.g., geographical location, data center location, location within the data center, location within the data center relative to locations of other cloud resources, or the like, as well as various combinations thereof). The locations of resources of the cloud environment may identify locations of physical resources of the cloud environment which may be used to host virtual/cloud resources, locations of virtual/cloud resources, or the like, as well as various combinations thereof. The locations of resources of the cloud environment may be provided at various levels of granularity (e.g., locations may correspond to one or more of data center locations, locations of racks within data centers, locations of services within data centers, or the like, as well as various combinations thereof). The representation of the cloud environment may specify interconnections of the cloud environment (e.g., interconnections between data centers, interconnections between resources of different data centers, interconnections between resources within data centers, or the like, as well as various combinations thereof). The representation of the cloud environment may specify efficiencies of the resources of the cloud environment. The representation of the cloud environment may specify costs of the resources of the cloud environment. The representation of the cloud environment may specify various other types of information which may be used to represent a cloud environment. The representation of the cloud environment may be a graph-based representation of the cloud environment.

At step 240, a mapping of the cloud service to the cloud environment is determined. The mapping of the cloud service to the cloud environment is determined based on the representation of the cloud service and the representation of the cloud environment. The mapping of the cloud service to the cloud environment specifies mapping of the information objects of the cloud service to the cloud environment and specifies the mapping of the cloud service virtual functions of the cloud service to the cloud environment (which also may include specification of the interconnections between the cloud service virtual functions within the cloud environment). The mapping of the cloud service to the cloud environment may be performed at any suitable level of granularity, which may depend on various factors (e.g., the service type of the cloud service, the requirements of the cloud service, the granularity of the representation of the cloud environment, or the like, as well as various combinations thereof). For example, if the nodes in the representation of the cloud environment represent distributed data centers, then the mappings may be to respective data center locations for the information objects and the cloud service virtual functions. For example, if the nodes in the representation of the cloud environment represent racks at data centers, then the mapping may be to respective racks of data centers for the information objects and the cloud service virtual functions. The determination of mappings to specific VMs or other more specific types of data center resources may be performed as part of this process or using one or more other mechanisms configured to determine specific mappings to VMs based on VM utilization or other factors.

At step 250, the cloud environment is configured to support the cloud service. The cloud environment is configured to support the cloud service based on the mapping of the cloud service to the cloud environment.

At step 299, method 200 ends.

Various embodiments of the capability for determining a distribution of a cloud service within a cloud environment may be used to solve a cloud service distribution problem (CSDP). In at least some embodiments, the CSDP is to find the placement of both content and virtual cloud service functions (vCSFs) over a distributed cloud network platform, that meets user requests, satisfies network resource capacities, and minimizes overall network cost. The CSDP may be formulated as a minimum cost flow problem in which cloud services are represented by a service graph that encodes the relationship between input and output information flows via the virtual functions that manipulate them. As a result, the CSDP can be efficiently formulated using only linear constraints and solved via integer linear programming (ILP). Various embodiments of the solution to the CSDP may jointly optimize the use of various resources (e.g., compute resources, storage resources, and transport resources) in arbitrary cloud network topologies, and may be able to capture flexible service chaining, resource consolidation savings, unicast and multicast delivery, latency constraints, or the like. Various embodiments of the solution to the CSDP may further provide conditions for which a relaxed version of the presented ILP leads to optimal polynomial-time solutions. Various embodiments of the solution to the CSDP may be further understood by way of an illustrative sample of cloud services that show the advantage of optimizing the placement of content and vCSFs over a programmable distributed cloud network and associated results determined for the illustrative sample of cloud services, which are discussed further below.

Various embodiments of the CSDP and the solution to the CSDP may be further understood by first considering that Internet traffic may soon be dominated by the consumption of resource and interaction intensive cloud services and applications from an increasing number of resource-limited communication end points. Both end user experience and overall network efficiency are expected to push a fundamental transformation from existing centralized network and cloud architectures toward a highly distributed converged cloud-network platform that is composed of a large number of cloud nodes distributed across an increasingly meshed converged core (e.g., metro-core or other suitable type of core). In such a massively distributed cloud network, and with the introduction of network functions virtualization (NFV) and software defined networking (SDN), vCSFs can be dynamically and elastically instantiated over commodity servers at multiple cloud locations close to the end users and interconnected via a programmable network fabric. In this manner, a cloud network operator can host a variety of services and applications over a common distributed physical infrastructure, thereby reducing both capital and operational expenses while also delivering high quality of experience (QoE). In order to maximize the benefits of this attractive scenario and enable its sustainable growth, it is expected that a cloud network operator must be able to deploy cloud services in such a way that the allocation of the associated vCSFs, and the content/information needed by the vCSFs, minimizes the overall use of the physical resources. Accordingly, as noted above, various embodiments of the capability for determining a distribution of a cloud service within a cloud environment may be used to solve the CSDP, as a generalization of the content distribution problem, in which a goal is to find the placement of both content and vCSFs such that user demands are satisfied with guaranteed QoE and minimum overall network cost.

Various embodiments of the CSDP, and the solution to the CSDP, are based on the notation of a service graph, which establishes the relationship between content/information objects via the virtual functions that manipulate those content/information objects. It is noted that, via the use of the service graph, the CSDP can be efficiently formulated as a minimum cost mixed-cast flow problem with compute, storage, and transport resource activation decisions, and solved via ILP. It is further noted that one of the aspects of the proposed formulation of the CSDP as a minimum cost flow problem is the introduction of generalized flow conservation constraints, which may be configured to assure the conservation of the combined compute, storage, and transport flows at each node in the network. It is further noted that additional conditions may be defined in order to provide a relaxed version of the proposed ILP that leads to optimal polynomial-time solutions. These and various other embodiments and advantages of the CSDP, and the solution to the CSDP, may be further understood by way of reference to an exemplary system model, a description of which follows.

Various embodiments of the CSDP, and the solution to the CSDP, may be further understood when considered within the context of a cloud network modeled as a directed graph $G=(V,E)$ with $|V|$ vertices and $|E|$ edges representing the network nodes of the cloud network and the links of the cloud network, respectively. The cloud network G is assumed to be a programmable cloud network. In the context of a distributed cloud network, a node may represent a distributed cloud location, in which vCSFs can be instantiated over compute and storage servers (e.g., commercial off the shelf (COTS) compute and storage servers or any other compute and storage servers), while an edge represents a virtual link (e.g., an IP link or other suitable type of link) between two cloud locations. A cloud service is implemented as a virtual network slice in G, referred to as a virtual cloud service network (vCSN), which is composed of a set of interconnected vCSFs over the cloud network G. It is noted that the virtual functions of a cloud service, at any level, may be referred to as vCSFs.

Figure 3:
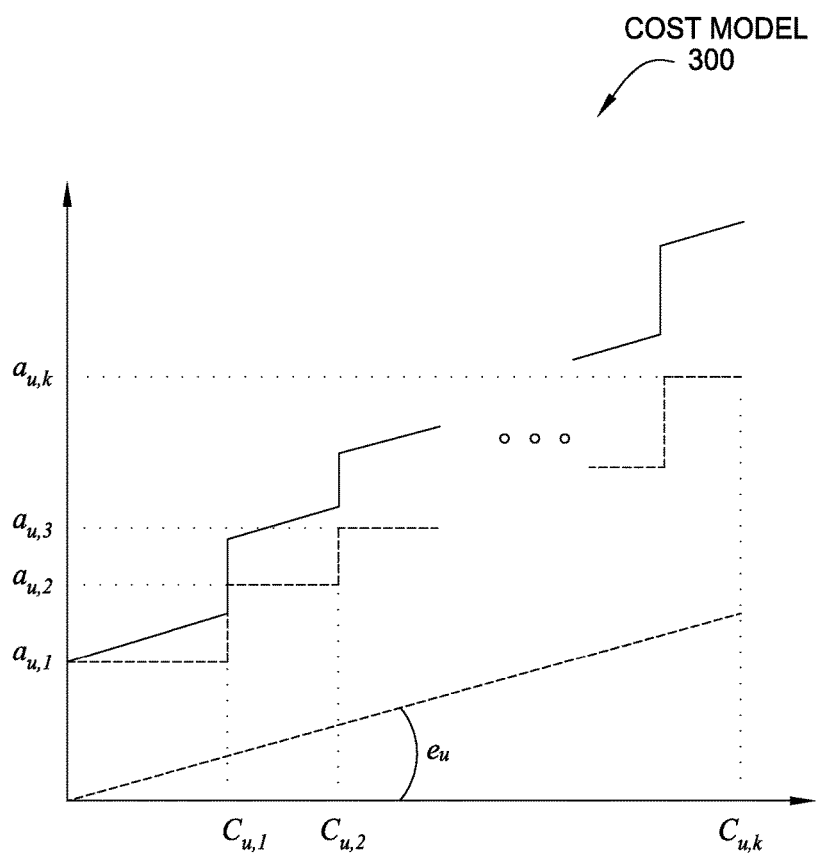
FIG. 3 depicts an exemplary cost function for a generic resource at a cloud node of an exemplary cloud network model.

The cloud network model may have a cost model associated therewith. In the cloud network model, it may be assumed that three types of physical resources are present: (1) processing resources, in the form of compute servers, (2) storage resources, in the form storage servers, and (3) transport resources in the form of links (e.g., IP links or other suitable links) between cloud locations. The cost associated with the activation and operation of a physical resource may be modeled according to the following two components: (1) an activation cost, which is the cost of switching on or activating a physical resource and its operation at zero load and (2) an operational cost, which is the cost of operating a physical resource as a function of the load on that resource. FIG. 3 illustrates a cost function 300 for a generic resource at a cloud node $u \in V$. It is noted that $c_u^{pr}$ and $c_u^{st}$ are used to denote the capacity of a compute server (in bps) and of a storage server (in bits) at cloud node $u \in V$, respectively, and that $a_{u,k}^{pr}$ and $a_{u,k}^{st}$ are used to denote the cost associated with the activation of k compute servers and k storage servers at node $u \in V$, respectively. As illustrated in FIG. 3, typically, $a_{u,k} < ka_u$ to capture the benefits of resource consolidation. Additionally, it is noted that $e_u^{pr}$ denotes the efficiency (cost per bps) of the compute servers at node $u \in V$ and $e_u^{st}$ denotes the efficiency (cost per bit) of the storage servers (or other physical resource, where applicable) at node $u \in V$ and, analogously, $c^{tr}$ denotes the capacity of an IP link (in bps), $a_{vu,k}^{tr}$ denotes the cost associated with the activation of k IP links between nodes v and u, and denotes $e_{vu}^{tr}$ the efficiency (cost per bps) of and IP link between v and u. It will be appreciated that, although the cloud network model is primarily depicted and described with respect to specific types of physical resources, the cloud network model may be used, more generally, for other types of physical resources and, thus, the variables used to describe the cost function of a generic resource at cloud node u∈V also may be referred to more generally (e.g., where $c_{u,k}$ and $a_{u,k}$ may be used to denote the capacity and activation cost of k physical resource units (e.g., k compute servers) at node u∈V, and $e_u$ may be used to denote the efficiency of the given physical resource at node u∈V).

Figure 4:
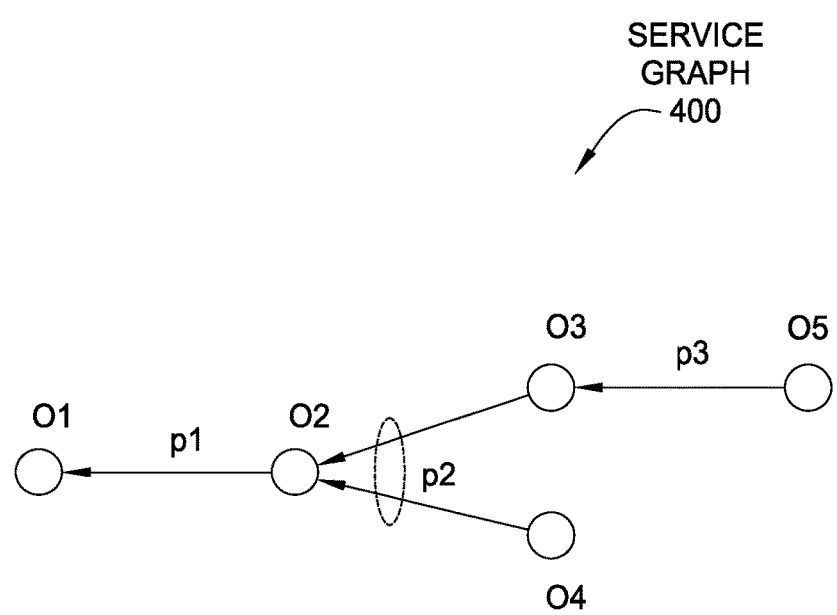
FIG. 4 depicts an exemplary service graph for an exemplary cloud network model.

The cloud network model may have a cloud service model associated therewith. In the cloud network model, the associated cloud service model may be defined as follows: (1) O may be used to denote the set of information objects or flows that can be stored, processed, or transported over the cloud network and (2) P may be used to denote the set of virtual functions that can be implemented over the cloud network. An information object o∈O may represent: hosted content (e.g., stored media offered by an on-demand content provider), live content (e.g., real-time stream produced by a live-content provider), processed content (e.g., personalized stream resulting from the combination of multiple source streams), or the like, as well as combinations thereof. An information object o∈O is, in general, the output of a function $p_o$∈P that requires the set of objects Z(o) as input. For example, in a personalized video streaming application, the final information object requested by the end user may be a processed video stream that results from the combination of multiple source video streams via a video processing function. A cloud service ϕ∈Ω may be represented by a rooted graph $T_\phi=(A_\phi,O_\phi)$, which may be referred to as the service graph. For any node o∈$O_\phi$⊂O, there is a directed edge (z,o)∈$A_\phi$ for all z∈Z(o). Hence, the set of objects Z(o)⊂O required to generate object o via function $p_o$ are represented as the children of o in the service graph $T_\phi$. In particular, the root of the service graph $r_\phi$∈R⊂O represents the final information object that needs to be delivered to the end user(s). It is noted that $r_\phi$ has no outgoing links in $T_\phi$, as it is not the input to any other object for cloud service ϕ. It is noted that the leaves of the rooted graph have no incoming links, as they represent source or hosted information that does not need to be created by a cloud service function. Hence, the service graph encodes the relationship between the objects that are necessary to deliver the final product to the end user(s) via the required cloud service functions. It may be noted that each object o∈O is uniquely characterized by the pair ($p_o$,Z(o)). This allows different objects to share the same input (but be created via different cloud service functions) or to share the same cloud service function (but have different inputs). Also, multiple services may include a same object o∈O as part of their service graphs. FIG. 4 depicts an exemplary service graph 400 for an exemplary cloud network model. More specifically, FIG. 4 depicts an exemplary service graph 400, which also may be denoted as $T_\phi=(A_\phi,O_\phi)$, with |$O_\phi$|=5 objects, |$A_\phi$|=4 edges, and |P|=3 virtual functions. In some embodiments, a cloud service also may be represented by multiple service graphs depending on the granularity of the demands for the service available to the cloud network operator (e.g., an operator can optimize the placement of functions for a mobile video service by using as input the average demand for video coming from the operator's mobile customers), in which case a single service graph, with its root representing the general class of mobile video and its arcs encoding the different functions the source video needs to go through to get delivered to the mobile users, suffices. In other embodiments, on the other hand, an operator may want to optimize its deployment by exploiting the specific demands for each video file/class available based on their popularity, in which case multiple service graphs, each rooted at each of the video files/classes, may be used. It is noted that a cloud service may be referred to as a service implemented in the cloud or, as primarily depicted and described herein, as a service implemented in a distributed cloud network. It will be appreciated that a service which utilizes embodiments of the capability for determining a distribution of a cloud service within a cloud environment as presented herein may be any suitable type of service, such as a network service (e.g., an "evolved packet core" service (vEPC), which then requires a set of virtual network functions or VNFs (e.g., vMME, vPGW, vSGW), or the like), a commercial application service (e.g., an immersive video service, which requires a set of virtual functions that determine how to combine multiple source video streams to generate final immersive video streams for the end users), or the like.

The cloud network model may have service requirements associated therewith. In the cloud network model, the associated service requirements may be defined in various ways. For purposes of clarity in describing embodiments of the CSDP, and the solution to the CSDP, herein, it may be assumed that, when a user requests a cloud service ϕ, the user is, in essence, requesting the final information object or flow represented by the root of the service graph, $r_\phi$∈R. Thus, it may be assumed that a content object o∈O may represent a specific content item or flow (e.g., a media file, a video feed from a particular source, or the like) or a set of content items or flows (e.g., a set of files in the same popularity class, a set of flows originating at a particular network location, or the like). It is noted that $B_o$ may be used to denote the size in bits of content object (or set of content objects) o∈O, and that $r_{d,o}$ may be used to denote the average request rate (requests per second) for object o∈R originating at destination d∈V (e.g., from the users served by cloud node d∈V). Then, the bit-rate associated to the flow of object o∈O in bps is given by $\lambda_{d,o}=r_{d,o}B_o$. In the case of object flows not associated to stored objects, but coming from live content sources, $\lambda_{d,o}$ may be used to directly denote the bit-rate of live flow o∈O. It is further noted that $h_{vu}$ may be used to denote the transport delay associated to link (v,u)∈E, that $h_u$ may be used to denote the processing delay at cloud node u∈V, and that $H_{d,o}$ may be used to denote the maximum delay (or maximum number of hops) allowed for the delivery of content object/class o∈O at destination d∈V as determined by the given service level agreements (SLAs). It will be appreciated that these service requirements may be defined in other ways, that various other service requirements may be used, or the like, as well as various combinations thereof.

Figure 5:
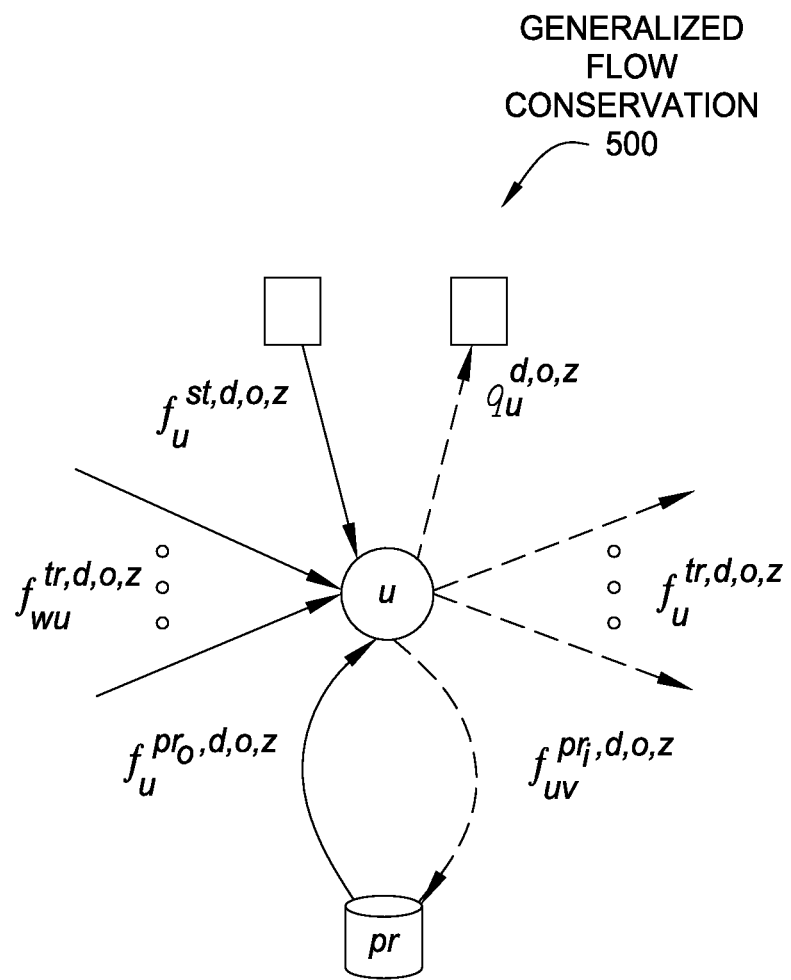
FIG. 5 depicts a generalized flow conservation at a node of an exemplary cloud network model.

The CSDP, as discussed above, may be formulated as a generalized minimum cost mixed-cast flow problem in which processing flows are used to model vCSF placement decisions. Additionally, resource activation variables may be used to model the allocation of compute, storage, and transport resources to accommodate the respective flows. In at least some embodiments, the CSDP may be characterized by the following flow variables:

User-Object Flows: User-Object Flows may be characterized by a triplet (d,o,z), which indicates the object being carried z∈O, the intended final product o∈O, and the intended destination d∈V. More specifically, $f_{vu}^{tr,d,o,z}$, $f_u^{st,d,o,z}$, $f_u^{pri,d,o,z}$ and $f_u^{pro,d,o,z}$ may be used to indicate the amount of object z transported/stored/processed by edge (v,u) or node u for final product o at destination d, respectively. It is noted that $f_u^{pri,d,o,z}$ and $f_u^{pro,d,o,z}$ denote, and differentiate between, the input and output flows of the processing unit at node u associated with triplet (d,o,z), respectively. This may be further understood by way of reference to FIG. 5, which depicts a generalized flow conservation 500 at a node of an exemplary cloud network model. More specifically, FIG. 5 illustrates generalized flow conservation at node u∈V, where pr represents the processing unit that hosts virtual functions at node u. FIG. 5 illustrates the network flows associated with a given triplet (d,o,z) at node u, where pr represents the processing unit that hosts virtual functions at node u and $q_u^{d,o,z}$ is a binary demand parameter that satisfies: $q_u^{d,o,z}=1$ iff u=d, z=o, and $\lambda_{d,o}>0$; $q_u^{d,o}=0$ otherwise. In FIG. 5, the incoming flow (depicted using solid lines) is composed of the incoming transport flows, the storage flow, and the processing flow coming in from the processing unit. In FIG. 5, the outgoing flow (depicted using dashed lines) is composed of the outgoing transport flows, the processing flow leaving node u towards the processing unit, and the demand flow.

Global Flows: Global Flows may be characterized by $f_{vu}^{tr}$, $f_u^{st}$, and $f_u^{pr}$, which determine the total amount of information flow carried, stored, and processed at a given physical node or link, respectively.

In the cloud network model, the objective function may be characterized by the global flows and may determine the cost associated with the storage, processing, and transport of information over the physical resources of the distributed cloud network. The objective function may be expressed as follows:

$$\text{minimize} \sum_{(v,u)\in E} \left( \sum_{k\in K_{vu}^{tr}} a_{vu,k}^{tr} l_{vu,k}^{tr} + e_{vu}^{tr} f_{vu}^{tr} \right) + \sum_{u\in V} \left( \sum_{k\in K_u^{st}} a_{u,k}^{st} l_{u,k}^{st} + e_u^{st} f_u^{st} \right) + \sum_{u\in V} \left( \sum_{k\in K_u^{pr}} a_{u,k}^{pr} l_{u,k}^{pr} + e_u^{pr} f_u^{pr} \right). \quad (1)$$

In (1), $l_{*,k}^*$ are binary resource activation variables that take value 1 if there are k active physical resources of a generic resource at a generic network element, and 0 otherwise. In (1), $K_u^{pr}$ is the set of integers denoting the possible number of active compute servers at node u∈V. In (1), $K_u^{st}$ is the set of integers denoting the possible number of active storage servers at node u∈V. In (1), $K_{vu}^{tr}$ is the set of integers denoting the possible number of active IP links between v and u.

The cloud network model may include generalized flow conservation constraints. In general, user-object flows must satisfy demand and flow conservation. By modeling the demand $q_u^{d,o}$ as part of the outgoing flow of node u∈V, the following generalized flow conservation constraints may be used:

$$q_u^{d,o,z} + \sum_{w\in N^+(u)} f_{uw}^{tr,d,o,z} + f_u^{pr_i,d,o,z} = \sum_{v\in N^-(u)} f_{vu}^{tr,d,o,z} + f_u^{st,d,o,z} + f_u^{pr_o,d,o,z} \quad \forall u, d, o, z. \quad (2)$$

These generalized flow conservation constraints of (2) state that the outgoing flow associated with a given triplet (d,o,z) must be equal to the incoming flow for that same triplet, for any node u∈V. As illustrated in FIG. 5 and discussed above, the outgoing flow and the incoming flow are composed as follows: (1) the outgoing flow is composed of the outgoing transport flows, the processing flow leaving node u towards the processing unit, and the demand flow and (2) the incoming flow is composed of the incoming transport flows, the storage flow, and the processing flow going out of the processing unit. In addition, each processing unit must satisfy the following flow conservation constraint:

$$f_u^{pr_o,d,o,z} \leq f_u^{pr_i,d,o,y} \quad \forall u,d,o,z,y\in Z(z). \quad (3)$$

This constraint (3) ensures that, in order to have a processed flow z for demand (d,o), a flow associated with each of the input objects required to generate z, y∈Z(z), for demand (d,o), must be present at the input of the processing unit.

The cloud network model may include virtual cloud service function availability constraints. The virtual cloud service function availability constraints allow restricting the set of virtual cloud service functions that can be implemented at a given cloud location. The virtual cloud service function availability constraints may be expressed as:

$$f_u^{pr_o,d,o,z}=0 \quad \forall u,d,o,z,p_z\notin P_u. \quad (4)$$

In these virtual cloud service function availability constraints, $P_u \subset P$ is the set of virtual functions available at node u∈V.

The cloud network model may include source constraints. The set of objects that are available in the network are denoted as source information. The set of objects that are available in the network are input for cloud services as $S \subset O$. The set $O_u \subset S$ may be defined as the objects permanently hosted by node u as input for cloud services:

$$f_u^{st,d,o,z}=1 \quad \forall u,d,o,z\in O^u. \quad (5)$$

Additionally, it may be necessary to ensure that source objects $S \subset O$ are not created in the network:

$$f_u^{pr_o,d,o,z}=0 \quad \forall u,d,o,z\in S. \quad (6)$$

It is noted that objects in S are allowed to be replicated and stored throughout the cloud network to reduce overall transport costs. Additionally, it is noted that, for all other objects o∈O \S, it may be necessary to ensure that these objects are not stored in the network, as these objects need to be created via their respective virtual functions at the cloud nodes across the network:

$$f_u^{st,d,o,z}=0 \quad \forall u,d,o,z\notin S. \quad (7)$$

The cloud network model may include source delay constraints. For source delay constraints, the term $\delta_{d,o,z}$ may be used to denote the (local) delay associated with a particular user-object flow (d,o,z), and may be computed as the sum of the delay associated with the transport and processing of (d,o,z) flows as follows:

$$\delta_{d,o,z} = \sum_{(v,u)\in E} f_{vu}^{tr,d,o,z} h_{vu} + \sum_{u\in V} f^{pr_o,d,o,z} h_u \quad \forall d, o, z. \quad (8)$$

In (8), without loss of generality, it is assumed that input processing flows have zero delay and capture all processing delay with the output processing flows. For source delay constraints, the term $\delta_{d,o,z}^{ag}$ may be used to denote the aggregate delay associated with user-object flow (d,o,z), and may be computed as the sum of the local delay ($\delta_{d,o,z}$) and the maximum across the aggregate delays of its input flows ($\delta_{d,o,y}^{ag}$, $\forall y\in Z(z)$) as follows:

$$\delta_{d,o,z}^{ag}=\delta_{d,o,z} \quad \forall d,o,z\in S, \quad (9)$$

$$\delta_{d,o,z}+\delta_{d,o,y}^{ag}\leq\delta_{d,o,z}^{ag} \quad \forall d,o,z,y\in Z(z). \quad (10)$$

For source delay constraints, the aggregate delay associated with the delivery of final object o∈O at destination d∈V is constrained to be no larger than the maximum delay allowed by the SLAs:

$$\delta_{d,o,o}^{ag} \leq H_{d,o} \quad \forall d,o. \tag{11}$$

The cloud network model may include mixed-cast constraints, which allow modeling of the unicast or multicast nature of storage/compute/transport flows via the corresponding relationship between user-object flows and global flows. Since a single stored object can be used to satisfy multiple demands, storage flows are said to be multicast. Hence, user-object storage flows for the same object, but for different destinations, are allowed to overlap, as indicated by the following constraints:

$$f_u^{st,d,o,z} \leq f_u^{st,z} \quad \forall u, d, o, \tag{12}$$

$$\sum_{z \in O} f_u^{st,z} B_z = f_u^{st} \quad \forall u. \tag{13}$$

On the other hand, since the use of multicasting generally cannot be exploited for video on-demand services, it is generally assumed that the transport and processing flows are unicast. As such, user-object transport and processing flows cannot overlap and must be added across both objects and destinations as follows:

$$\sum_{d \in V} \sum_{o \in O} \sum_{z \in O} f_{vu}^{tr,d,o,z} \lambda_{d,o} B_z = f_{vu}^{tr} \quad \forall (v, u), \tag{14}$$

$$\sum_{d \in V} \sum_{o \in O} \sum_{z \in O} f_u^{pro,d,o,z} \lambda_{d,o} B_z \gamma_z = f_u^{pr} \quad \forall u. \tag{15}$$

It is noted that user-object transport and output processing flows must be sized by both the size of the object $B_z$ and the request rate $\lambda_{d,o}$. In addition, output processing flows are scaled by a factor $\gamma_z$ that captures the overhead associated with the generation of object z from its input Z(z) via function $p_z$. It will be appreciated that, in order to capture the use of multicast technologies for the delivery of live streaming applications, for example, the mixed-cast flow model would require updating of (14) and (15) as in (12) and (13).

The cloud network model may include capacity constraints. The global flows must satisfy capacity constraints as follows:

$$f_{vu}^{tr} \leq \sum_{k \in K_{vu}^{tr}} c_{vu,k}^{tr} l_{vu,k}^{tr} \quad \forall (v, u), \tag{16}$$

$$f_u^{st} \leq \sum_{k \in K_u^{st}} c_{u,k}^{st} l_{u,k}^{st} \quad \forall u, \tag{17}$$

$$f_u^{pr} \leq \sum_{k \in K_u^{pr}} c_{u,k}^{pr} l_{u,k}^{pr} \quad \forall u, \tag{18}$$

where the binary activation variables ensure that only one capacity level is activated, $$\sum_{k \in K_{vu}^{tr}} l_{vu,k}^{tr} \leq 1 \quad \forall (v, u), \tag{19}$$

$$\sum_{k \in K_u^{st}} l_{u,k}^{st} \leq 1 \quad \forall u, \tag{20}$$

$$\sum_{k \in K_u^{pr}} l_{u,k}^{pr} \leq 1 \quad \forall u. \tag{21}$$

The cloud network model may include integer/fractional constraints. The resource activation variables are set to be binary as follows:

$$l_{vu,k}^{tr}, l_{u,k}^{st}, l_{u,k}^{pr} \in \{0,1\} \quad \forall (v,u),u,k. \tag{22}$$

The user-object flows may be binary or fractional as follows:

$$f_u^{tr,d,o,z}, f_u^{st,d,o,z}, f_u^{pr,d,o,z}, f_u^{pro,d,o,z} \in \{0,1\} \text{ or}$$
$$\in [0,\infty) \quad \forall (v,u),u,d,o,z. \tag{23}$$

The cloud service distribution problem may be formulated as an integer linear program (ILP) with objective function (1) and various combinations of constraints (2)-(23). Thus, in its most general form, the CSDP is NP-hard and its complexity increases exponentially with the number of integer variables. However, this number can be significantly reduced based on the following conditions. On one hand, binary flow variables in mixed-cast flow problems can be relaxed if: a) storage flows are fixed, as in live streaming applications, b) the network topology is a tree, or c) the network can perform intra-session network coding. On the other hand, as used in lower-bounded facility location problems, resource consolidation can be captured by lower-bounding the load on each resource, reducing the number of binary activation variables. It is noted that this indicates the existence of regimes of practical interest in which the CSDP admits solutions of reduced and even polynomial-time complexity. As discussed above, powerful linear programming solvers can be used to provide efficiency solutions to integer versions of the CSPD.

Various embodiments of the CSDP, and the solution to the CSDP, may be further understood when considered within the context of an illustrative example in which the CSDP is applied to and solved for an exemplary metropolitan area network based on a linear programming solver.

Figure 6:
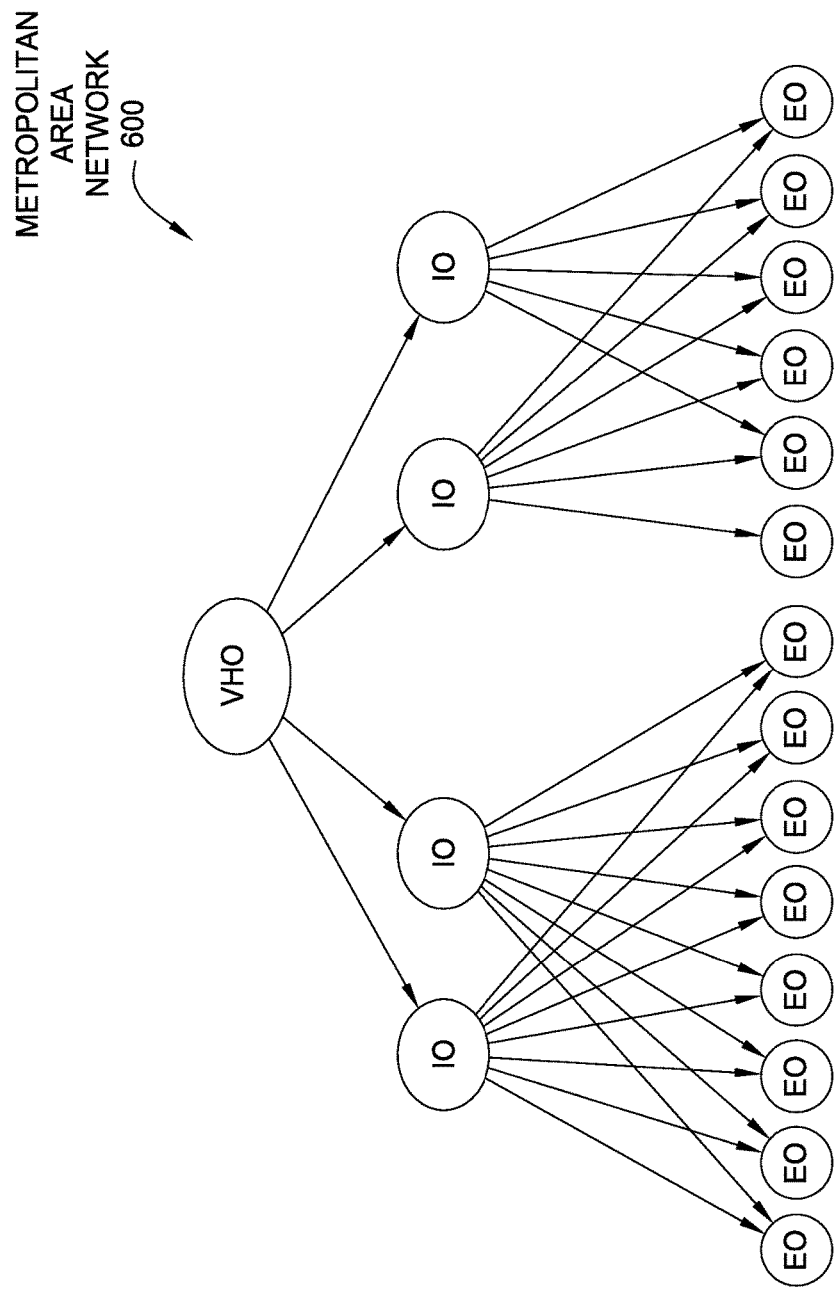
FIG. 6 depicts an exemplary metropolitan area network for an illustrative representation of and solution to a cloud service distribution problem based on a cloud network model.

For this illustrative example, as noted above, it is assumed that the CSDP is being solved for a metropolitan area network. FIG. 6 depicts an exemplary metropolitan area network 600 including 19 nodes as follows: 1 Video Head Office (VHO), 4 Intermediate Offices (IOs), and 14 End Offices (EOs). The EOs aggregate end user requests and represent the destination nodes in the cloud network model. It is assumed that the transport/storage/processing capacities and costs are homogenous across the network and have the values indicated in Table 1.

TABLE 1

| | Capacity Per Link/Server | Activation Cost |
|---|---|---|
| Transport | 100 Mbps | k |
| Storage | 1 GB | 10 log(k + 1) |
| Processing | 100 Mbps | $a^{pr}$ log(k + 1) |

In Table 1, k indicates the number of active physical links, compute and storage servers, respectively. For simplicity, load-dependent costs (typically dominated by activation costs) are neglected and all activation costs are normalized to the transport cost. The parameter $a^{pr}$ is used to analyze the effect of increasing compute costs at cloud locations. In terms of capacity, the following capabilities are assumed:

100 Mbps IP ports, 100 Mbps compute servers, and 1 GB storage servers. The transport activation cost is assumed to be proportional to the number of active links/ports, while the storage and processing costs follow a non-decreasing concave function with the number of active physical resources in order to capture the cost benefits of resource consolidation at a particular cloud location. Finally, it is assumed that object size and processing overhead are homogenous, with $B_o=1$ GB and $\gamma_o=1$, $\forall o \in O$. It is noted that, for this initial set of results, the demand and cost parameters are set to capture an initial sample of scenarios that illustrate the trade-offs between the different cost components. As discussed above, the cloud network model allows setting up of the cost parameters according to the particular scenario of interest, and will depend on the actual objective (physical infrastructure dimensioning, vCSN slice dimensioning, or the like), business model (pay-per-capacity, pay-per-use, or the like), resource specifications, service requirements, or the like, as well as various combinations thereof.

Figure 7:
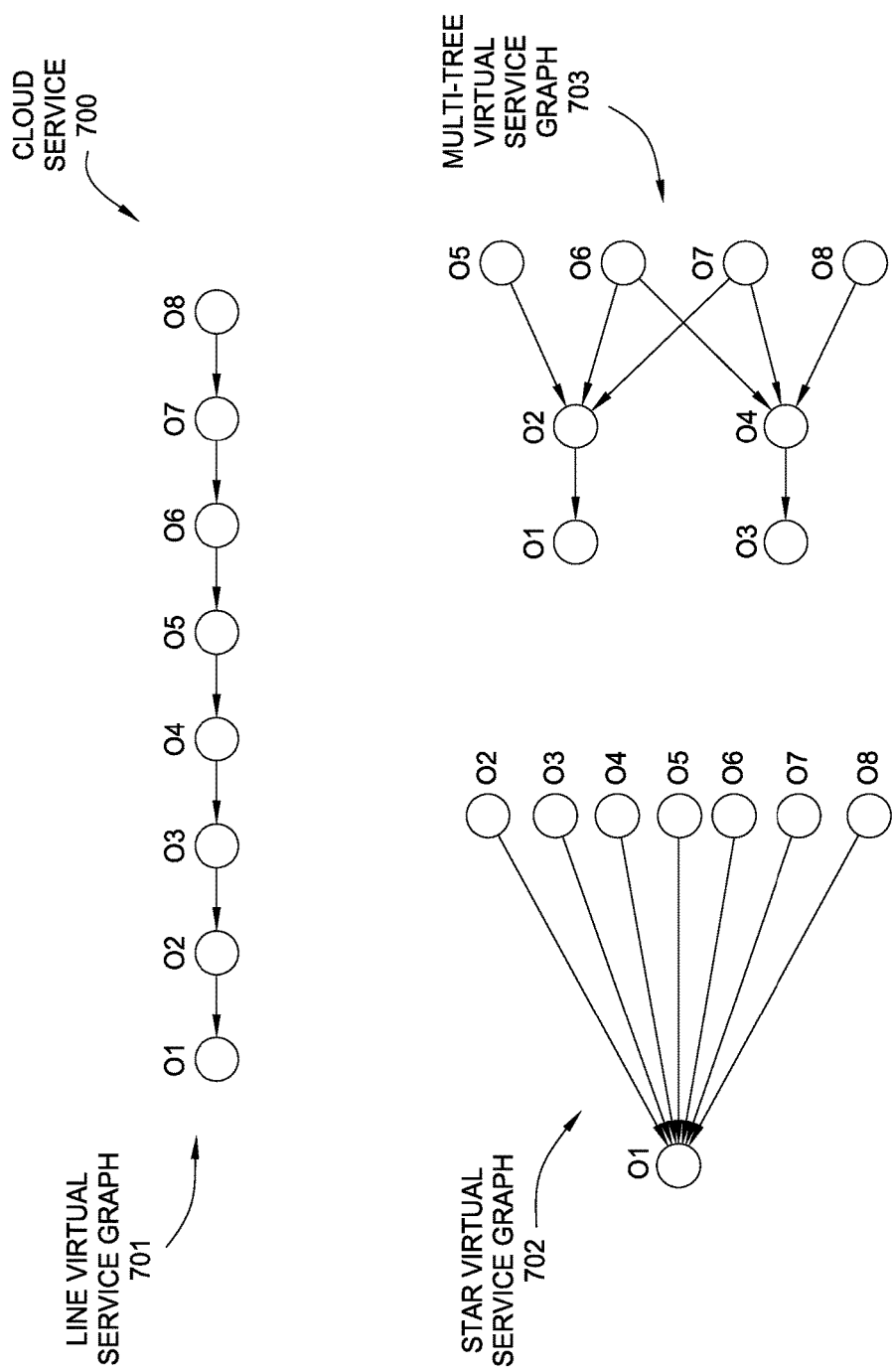
FIG. 7 depicts an illustrative set of cloud services for the exemplary metropolitan area network of FIG. 6.

For this illustrative example, an illustrative set of cloud services is considered. FIG. 7 depicts an illustrative set of cloud services 700 for the exemplary metropolitan area network 600 of FIG. 6. The illustrative set of cloud services 700 includes a line virtual service graph 701, a star virtual service graph 702, and a multi-tree virtual service graph 703. In general, as discussed above, a service graph is a rooted graph, in which the leave nodes represent the input information objects for the cloud service, and the root node represents the final information object that must be delivered to the end user. It is noted that line service graphs and star graphs are generally important structures, as any cloud service can be represented via a combination of line and star graphs. For example, an example of a line service is a virtual network service (e.g., vEPC or other virtual network service) typically defined by a chain of virtual network functions and an example of a star service is an immersive video service in which the video stream delivered to the end user results from the combination of multiple source video streams.

For this illustrative example, the following three solution approaches are analyzed for the exemplary metropolitan area network 600: (1) a vCSN solution resulting from solving the proposed ILP when all of the nodes (namely, the VHO, IOs, and EOs) are considered to be cloud nodes and, thus, allowed to host content and virtual functions as needed, (2) a centralized solution that is obtained by placing all content and virtual functions at the VHO, and (3) a distributed solution that is obtained by placing all content and virtual functions at each of the EOs.

FIGS. 8A-8D depict solutions obtained by solving the cloud service distribution problem, based on the cloud services of FIG. 7, for the exemplary metropolitan area network of FIG. 6. It is noted that, in FIGS. 8A-8D, the solid lines represent links activated in the vCSN solution and the nodes with shading represent nodes activated (and, thus, hosting associated functions) within the vCSN solution.

Figure 8A:
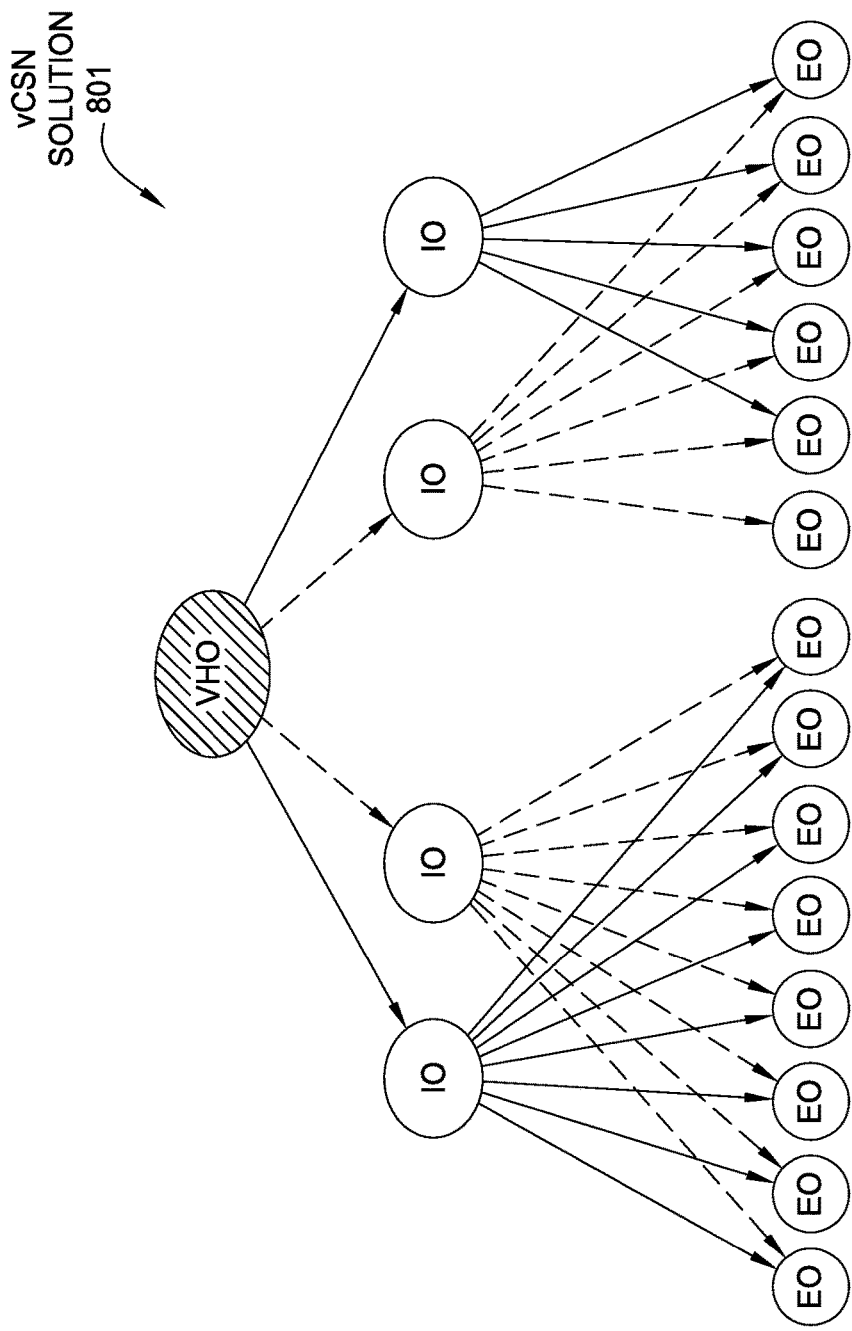
FIGS. 8A-8D depict solutions obtained by solving the cloud service distribution problem, based on cloud services of FIG. 7, for the exemplary metropolitan area network of FIG. 6.

FIG. 8A illustrates a vCSN solution obtained by solving the cloud service distribution problem, for the metropolitan area network 600 of FIG. 6, based on the star virtual service graph 701 of FIG. 7. In the vCSN solution 801 of FIG. 8A, the 14 EOs have been partitioned into 3 groups ($G_1$=1-4, $G_2$=5-8 and $G_3$=9-14) and $\lambda_{G1}$, $\lambda_{G2}$, and $\lambda_{G3}$ are used to denote the request rate aggregated at the EOs of each group, respectively. In this example, the demands are assumed to be low and, thus, $\lambda_{G1}$, $\lambda_{G2}$, and $\lambda_{G3}$ each are set equal to 0.1. In FIG. 8A, it may be seen that, when demands are low, the content and virtual functions are placed at the VHO, thereby reducing compute and storage costs via resource consolidation and reduced content replication.

Figure 8B:
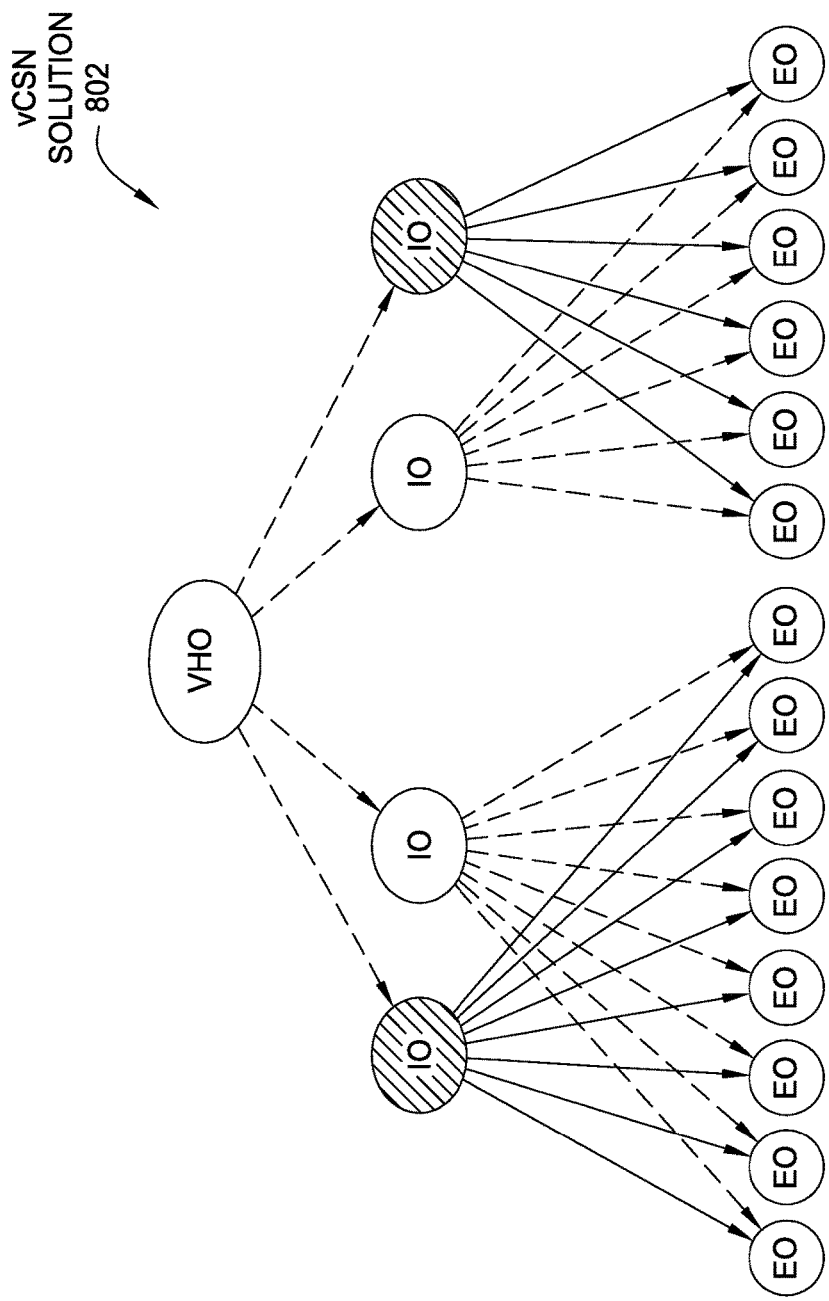

FIG. 8B illustrates a vCSN solution obtained by solving the cloud service distribution problem, for the metropolitan area network 600 of FIG. 6, based on the star virtual service graph 701 of FIG. 7. In the vCSN solution 802 of FIG. 8B, as in the vCSN solution 801 of FIG. 8A, the 14 EOs have been partitioned into 3 groups ($G_1$=1-4, $G_2$=5-8 and $G_3$=9-14) and $\lambda_{G1}$, $\lambda_{G2}$, and $\lambda_{G3}$ are used to denote the request rate aggregated at the EOs of each group, respectively. In this example, the demands are now assumed to be high and, thus, $\lambda_{G1}$, $\lambda_{G2}$, and $\lambda_{G3}$ each are set equal to 1.0. In FIG. 8B, it may be seen that, when demands are high, cloud resources are consolidated at the IOs in order to reduce the transport costs from the VHO to the IOs.

Figure 8C:
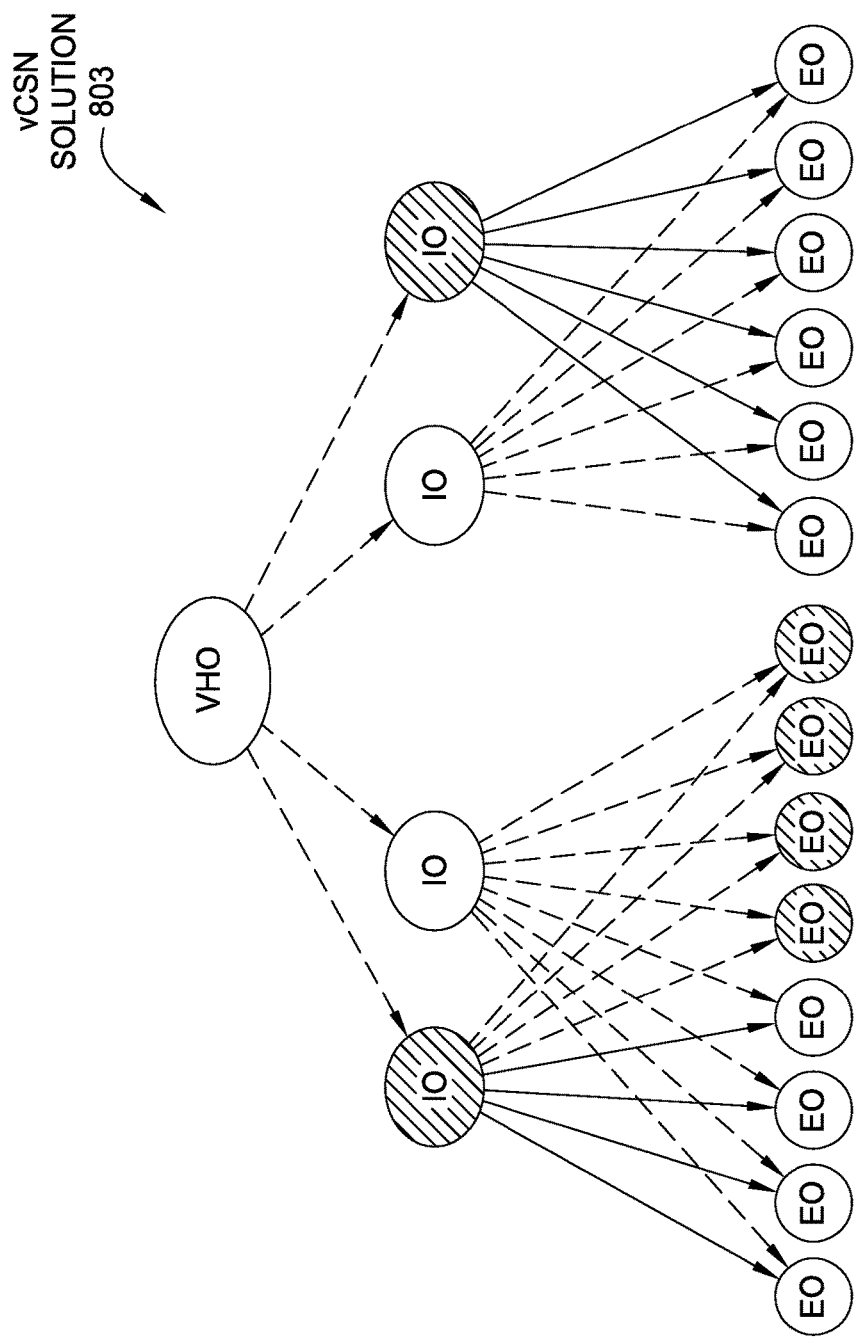

FIG. 8C illustrates a vCSN solution obtained by solving the cloud service distribution problem, for the metropolitan area network 600 of FIG. 6, based on the star virtual service graph 701 of FIG. 7. In the vCSN solution 803 of FIG. 8C, as in the vCSN solutions 801 and 802 of FIGS. 8A and 8B, the 14 EOs have been partitioned into 3 groups ($G_1$=1-4, $G_2$=5-8 and $G_3$=9-14) and $\lambda_{G1}$, $\lambda_{G2}$, and $\lambda_{G3}$ are used to denote the request rate aggregated at the EOs of each group, respectively. In this example, the demands of $G_1$ and $G_3$ remain the same as in the vCSN solution 802 of FIG. 8B ($\lambda_{G1}$=1.0 and $\lambda_{G3}$=1.0), but the demand of $G_2$ is increased to $\lambda_{G3}$=3. In FIG. 8C, it may be seen that the optimal solution allocates both source content and virtual functions directly at the EOs.

Figure 8D:
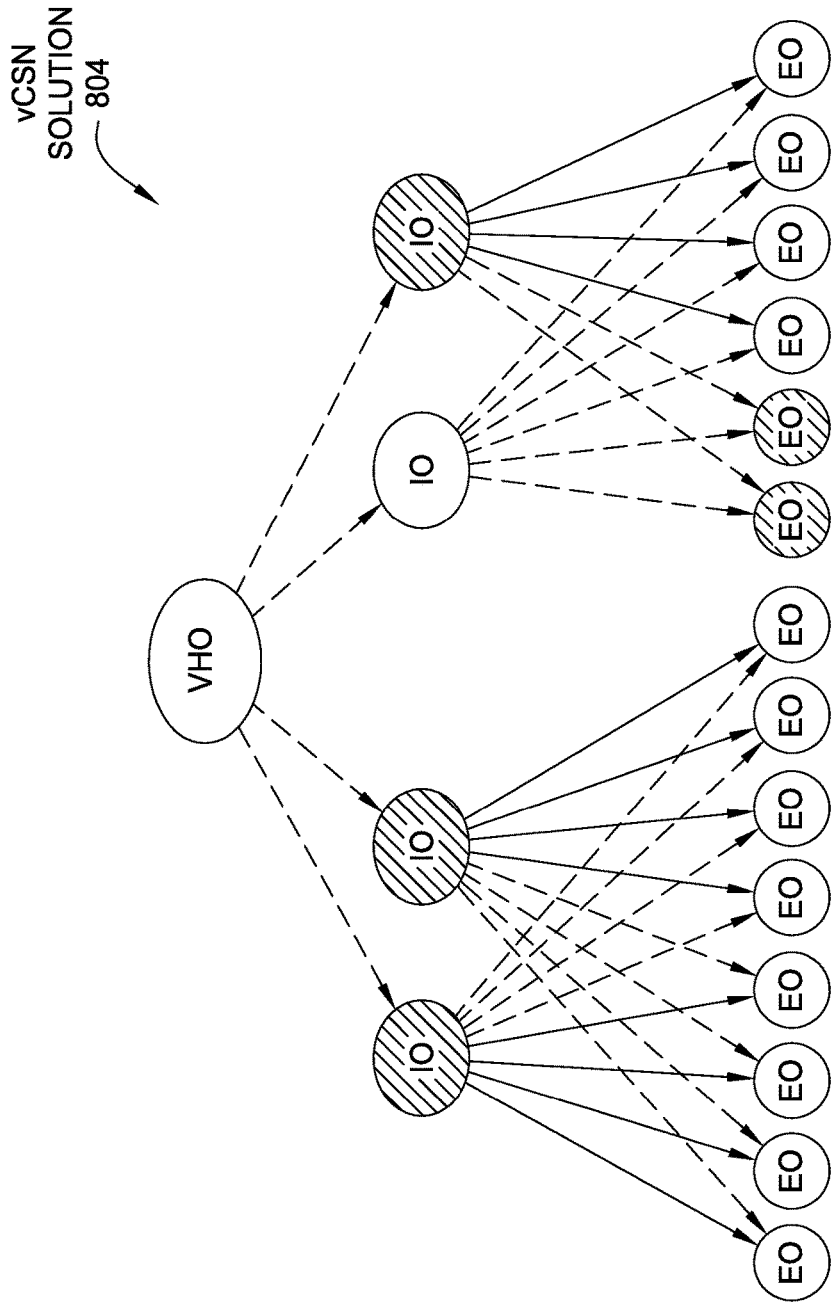

FIG. 8D illustrates a vCSN solution obtained by solving the cloud service distribution problem, for the metropolitan area network 600 of FIG. 6, based on the star virtual service graph 701 of FIG. 7. In the vCSN solution 804 of FIG. 8D, as in the vCSN solutions 801, 802, and 803 of FIGS. 8A, 8B, and 8C, the 14 EOs have been partitioned into 3 groups ($G_1$=1-4, $G_2$=5-8 and $G_3$=9-14) and $\lambda_{G1}$, $\lambda_{G2}$, and $\lambda_{G3}$ are used to denote the request rate aggregated at the EOs of each group, respectively. In this example, the demands of $G_1$, $G_2$, and $G_3$ remain the same as in the vCSN solution 802 of FIG. 8B ($\lambda_{G1}$=1.0, $\lambda_{G2}$=1.0, and $\lambda_{G3}$=1.0), but, instead of the unlimited processing/compute capacity assumed in FIGS. 8A, 8B, and 8C, the processing/compute capacity at each cloud location is limited to 40 servers (4 Gbps). In FIG. 8D, as a result of this limitation of the processing/compute capacity, the demands of $G_1$ and $G_2$ have to be satisfied by different IOs. It is noted that, in order to satisfy the demand of $G_3$, the network does not use the respective upstream IO, as in this case the resource consolidation savings of 2 EOs is not sufficient to compensate for the savings in transport costs obtained by distributing the content and virtual function to the EOs.

Figure 9:
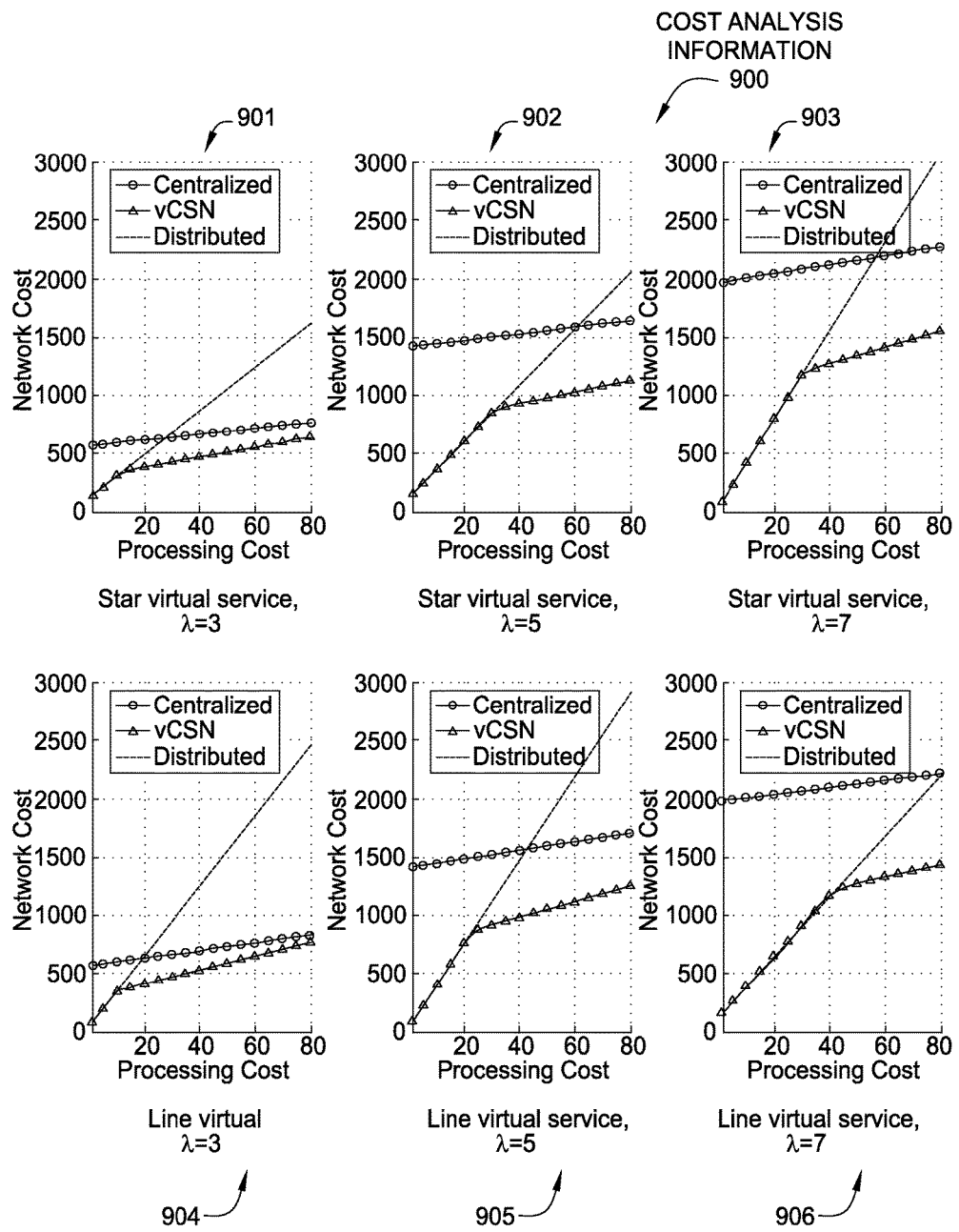
FIG. 9 depicts cost analysis information for solutions of the cloud service distribution problem, based on cloud services of FIG. 7, for the exemplary metropolitan area network of FIG. 6.

FIG. 9 depicts cost analysis information for solutions of the cloud service distribution problem, based on the cloud services of FIG. 7, for the exemplary metropolitan area network of FIG. 6. As depicted in FIG. 9, the cost analysis information 900 includes comparisons of network cost information, for delivery of line virtual services (e.g., based on line virtual service graph 701 of FIG. 7) and star virtual services (e.g., based on star virtual service graph 702 of FIG. 7). The cost analysis information 900 is presented in the form of six graphs 901-906, where each graph includes processing cost on the x-axis and network cost on the y-axis and, further, where each graph plots the cost analysis information 900 for the three solutions approaches being analyzed for the exemplary metropolitan area network 600 as discussed above (namely, (1) a vCSN solution resulting from solving the proposed ILP when all of the nodes (namely, the VHO, IOs, and EOs) are considered to be cloud nodes and, thus, allowed to host content and virtual functions as needed, (2) a centralized solution that is obtained by placing all content and virtual functions at the VHO, and (3) a distributed solution that is obtained by placing all content and virtual functions at each of the EOs. The graphs 901-903 include cost analysis information for a star virtual service (e.g., based on star virtual service graph 702 of FIG. 7) where $\lambda=3$, 5, and 7, respectively. The graphs 904-906 include cost analysis information for a line virtual service (e.g., based on line virtual service graph 701 of FIG. 7) where demand rates $\lambda=3$, 5, and 7, respectively.

As depicted in FIG. 9, the distribution solution approach is more efficient when the processing cost is low as compared to the transport cost; however, as the processing cost increases, the cost savings due the consolidation of compute and storage resources at one cloud location becomes larger than the additional transport cost required to deliver the final information object to the end users, making the centralized solution approach more efficient.

As depicted in FIG. 9, the processing cost for which the centralized solution approach becomes more efficient than the distributed solution approach differs for the star virtual service (graphs 901-903) and the line virtual services (graphs 904-906), generally being higher for the star virtual service. This can be explained by the fact that a star virtual service uses one virtual function that combines all of the source information flows into a final flow for the end user, while a line service uses a number of virtual functions (in this case 7, although the number may be lower or higher in other cases) in order to generate the final information flow for the end user. This results in a stronger impact of the resource consolidation savings for the line virtual service.

As depicted in FIG. 9, the vCSN solution approach adapts to the network conditions (e.g., resource costs) and service requirements (e.g., service type and demand rates) in order to minimize the total network cost. If the processing cost is low, the optimal vCSN results in a fully distributed approach. As the processing cost becomes more relevant, virtual functions start moving higher in the network hierarchy to exploit resource consolidation savings, thereby converging into a centralized solution for high enough processing cost. It may be seen that, for a processing cost equal to the storage cost ($a^{pr}=10$), and the demand rates $\lambda=3$, 5, and 7, the vCSN solution approach reduces the overall network cost, as compared to the centralized solution approach, by a factor of 2.6, 4 and 5.2 for the star virtual service, respectively, and by a factor of 2.4, 3.6 and 4.8 for the line virtual service, respectively.

Figure 10:
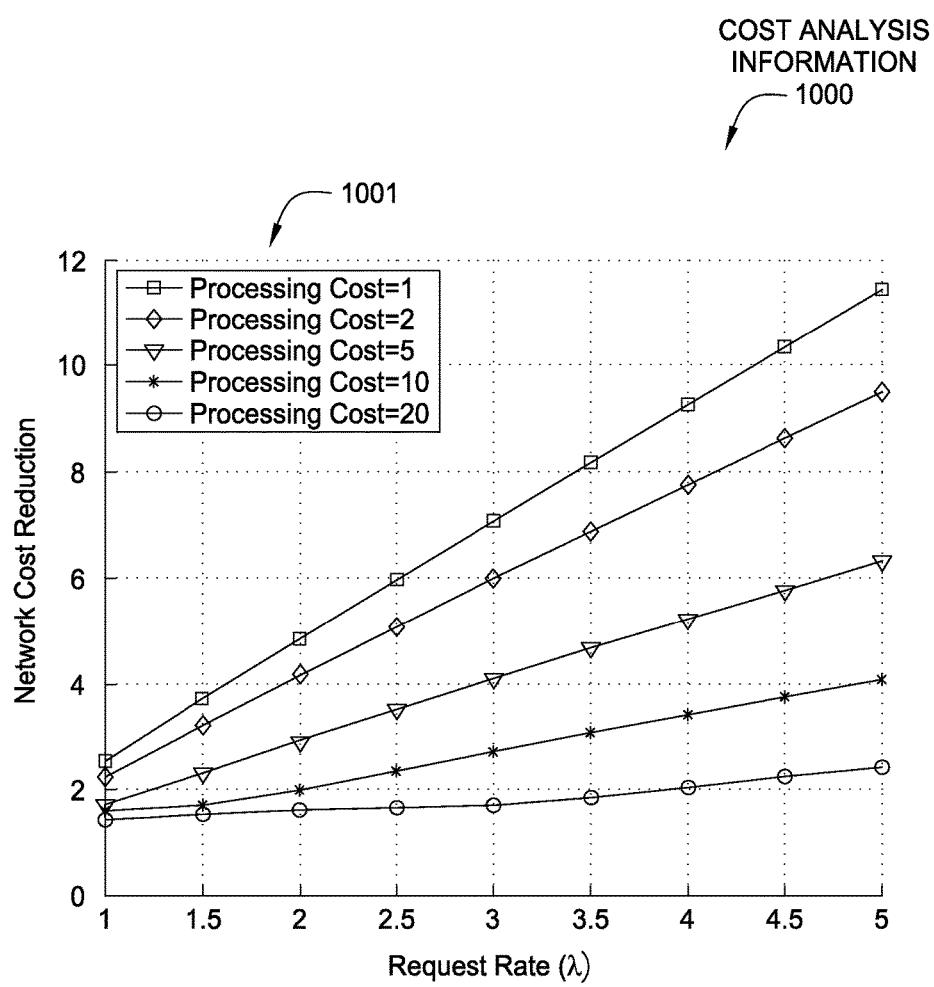
FIG. 10 depicts cost analysis information for solutions of the cloud service distribution problem, based on the multi-tree virtual service of FIG. 7, for an expanded version of the exemplary metropolitan area network of FIG. 6.

FIG. 10 depicts cost analysis information for solutions of the cloud service distribution problem, based on the multi-tree virtual service of FIG. 7, for an expanded version of the exemplary metropolitan area network of FIG. 6. The multi-tree virtual service of FIG. 7 corresponds to the multi-tree virtual service graph 703 of FIG. 7, which may represent, for example, a video streaming service in which five source video streams ($o_5, \ldots, o_8$) can be combined to produce two customized or augmented video streams ($o_2$ and $o_4$), plus two more video streams resulting from adding advertisement to $o_2$ and $o_4$, resulting in $o_1$ and $o_2$. The expanded version of the exemplary metropolitan area network 600 of FIG. 6 is assumed to be a network that includes 120 nodes, including 1 VHO, 20 IOs, and 99 EOs. For this network, it is assumed that demand rates are homogeneous across the EOs and are driven by the object popularities, with $p_{o_1}=0.2$, $p_{o_2}=0.4$, $p_{o_3}=0.1$ and $p_{o_4}=0.3$, describing the popularity distribution such that demand rates are given by $\lambda_{o_i}=\lambda p_{o_i}$ $i \in \{1,2,3,4\}$. As depicted in FIG. 10, the cost analysis information 1000 is presented in the form of a graph 1001 in which includes Request Rate ($\lambda$) on the x-axis and Network Cost Reduction on the y-axis. The Network Cost Reduction is the cost reduction obtained via use of the VCSN solution approach as compared to the centralized solution approach. The graph 1001 represents network cost reduction as a function of request rate $\lambda$ for different processing cost values (illustratively, processing cost values of 1, 2, 5, 10, and 20). As depicted in FIG. 10, the cost reduction obtained via the vCSN solution approach is especially relevant at high request rates and low processing costs. In particular, for a demand rate $\lambda=1$, the vCSN solution approach reduces the network cost by a factor of 1.4 for processing cost $a^{pr}=1$, and by a factor of 2.6 when $a^{pr}=20$. Similarly, when the demand rate increases to $\lambda=5$, the cost reduction factor goes up to 11.5 for processing cost $a^{pr}=20$.

Various embodiments of the capability for distribution of a cloud service within a cloud environment support placement of both content and virtual network functions over a distributed cloud network. As discussed above, the CSDP may be formulated as a minimum cost flow problem and an efficient linear programming formulation that includes and generalizes the content placement and the virtual function placement problems may be provided. As discussed above, the vCSN resulting from the solution to the CSDP jointly optimizes the use of compute, storage, and transport resources in arbitrary cloud network topologies, is able to capture arbitrary cloud services via an efficient service graph representation, takes into account various types of information and constraints (e.g., resource consolidation savings, unicast and multicast delivery, capacity, latency constraints, or the like), or the like, as well as various combinations thereof.

Various embodiments of the capability for distribution of a cloud service within a cloud environment may be provided or even enhanced based on use of mechanisms which support programmability of the networked cloud platform (e.g., NFV mechanisms, SDN mechanisms, or the like), based on use of a logically centralized control plane configured to obtain global network information and to use the global network information to optimize the operation and dimensioning of resources, or the like, as well as various combinations thereof.

Various embodiments of the capability for distribution of a cloud service within a cloud environment may provide various advantages. Various embodiments of the capability for distribution of a cloud service within a cloud environment may be particularly useful or valuable in a fast-approaching future in which network providers have the opportunity to, by leveraging their key infrastructure assets and proximity to end users, depart from providing commoditized broadband services and move up in the value chain by becoming the ubiquitous distributed compute platform directly hosting the content and applications of users worldwide. Various embodiments of the capability for distribution of a cloud service within a cloud environment enable such revenue opportunities to become a reality by enabling networked cloud providers to optimize the dimensioning and operation of the their distributed network and cloud resources so that cloud services, including existing cloud services and next-generation cloud services which may be developed in the future (both of which may be represented using service graphs as discussed herein), can be delivered with guaranteed end user QoE and minimum overall cost. Various embodiments of the capability for distribution of a cloud service within a cloud environment obviate the need to deploy cloud services within a centralized cloud environment (e.g., within a single data center) and enable deployment of cloud services within a distributed cloud environment, thereby enabling deployment of cloud services having more stringent performance requirements (e.g., allowing deployment of not only best effort cloud services which may currently be supported with deployment within a centralized cloud environment, but also allowing deployment of various other types of cloud services having more stringent performance requirements than best effort cloud services). Various embodiments of the capability for distribution of a cloud service in a cloud environment may provide various other advantages.

It will be appreciated that, although primarily presented herein with respect to embodiments supporting distribution of a cloud service within a cloud environment, various embodiments presented herein may be used or adapted to support distribution of other types of functions or services. For example, various embodiments presented herein may be used or adapted to support distribution of network functions (e.g., virtualization of network functions of a Radio Access Network (RAN), virtualization of network functions of an Evolved Packet Core of a Long Term Evolution (LTE) network (e.g., virtualization of one or more of a Mobility Management Entity (MME) function, a Service Gateway (SGW) function, a Packet Data Network (PDN) Gateway (PGW) function, or the like), virtualization of network functions of an Internet Protocol (IP) Multimedia Subsystem (IMS) network, or the like), distribution of other types of services not traditionally hosted within the cloud, distribution of newly identified cloud services not currently supported within the cloud, or the like, as well as various combinations thereof. It will be appreciated that, in at least some such embodiments, network functions or other types of functions virtualized within a cloud environment also may be considered cloud services provided within a cloud environment.

It will be appreciated that, in at least some such embodiments, a cloud service also may involve a combination of functions at multiple layers.

Figure 11:
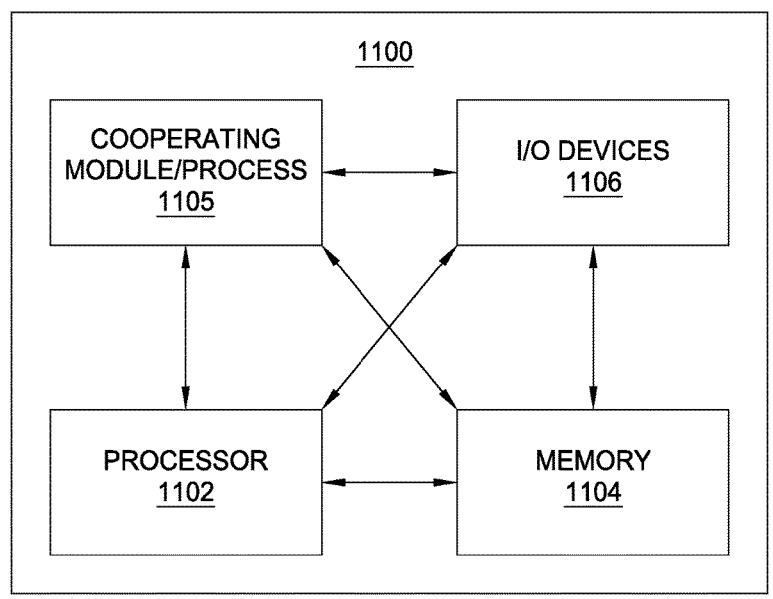
FIG. 11 depicts a high-level block diagram of a computer suitable for use in performing functions described herein.

FIG. 11 depicts a high-level block diagram of a computer suitable for use in performing functions described herein.

The computer 1100 includes a processor 1102 (e.g., a central processing unit (CPU) and/or other suitable processor(s)) and a memory 1104 (e.g., random access memory (RAM), read only memory (ROM), and the like).

The computer 1100 also may include a cooperating module/process 1105. The cooperating process 1105 can be loaded into memory 1104 and executed by the processor 1102 to implement functions as discussed herein and, thus, cooperating process 1105 (including associated data structures) can be stored on a computer readable storage medium, e.g., RAM memory, magnetic or optical drive or diskette, and the like.

The computer 1100 also may include one or more input/output devices 1106 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 1100 depicted in FIG. 11 provides a general architecture and functionality suitable for implementing functional elements described herein and/or portions of functional elements described herein. For example, the computer 1100 provides a general architecture and functionality suitable for implementing one or more of an element of a DDC 110, a portion of an element of a DDC 110, an element of CN 120, a portion of an element of CN 120, CD 130, a portion of CD 130, CSMS 140, a portion of CSMS 140, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory including computer program code;
wherein the at least one memory and the computer program code are configured to, with the at least one processor, cause the apparatus to at least:
determine a graph-based representation of a cloud service, wherein the graph-based representation of the cloud service comprises a set of nodes representing a respective set of information objects associated with the cloud service and a set of edges representing a cloud service virtual function of the cloud service, wherein the set of nodes includes a root node representing an output information object to be output by the cloud service;
determine a graph-based representation of a cloud environment configured to host the cloud service;
determine a mapping of the cloud service to the cloud environment based on the graph-based representation of the cloud service and the graph-based representation of the cloud environment; and
initiate, based on the mapping of the cloud service to the cloud environment, configuration of the cloud environment to support the cloud service, wherein configuration of the cloud environment to support the cloud service includes allocating cloud resources of the cloud environment on physical resources of the cloud environment.

2. The apparatus of claim 1, wherein the graph-based representation of the cloud service comprises a rooted, directed graph.

3. The apparatus of claim 1, wherein the set of nodes includes a leaf node representing a respective input information object received by the cloud service.

4. The apparatus of claim 1, wherein the set of nodes includes a leaf node representing a respective source information object that does not need to be created by the cloud service.

5. The apparatus of claim 1, wherein the set of nodes includes an intermediate node representing a respective information object that is output by a first one of the edges and that is input to a second one of the edges.

6. The apparatus of claim 1, wherein, for one of the nodes, the respective information object represented by the one of the nodes is characterized by the cloud service virtual function, the cloud service virtual function specifying a set of one or more input information objects necessary to generate the respective information object.

7. The apparatus of claim 6, wherein the set of edges includes one or more directed edges directed from one or more nodes of the set of nodes representing the respective set of one or more input information objects to the one of the nodes representing the respective information object.

8. The apparatus of claim 1, wherein the set of edges includes one or more directed edges directed from one or more nodes of the set of nodes representing one or more input information objects toward the root node representing the output information object, wherein the cloud service virtual function is configured to process the one or more input information objects to produce the output information object.

9. The apparatus of claim 1, wherein the graph-based representation of the cloud environment comprises a node representing a location of the cloud environment or an element of the cloud environment.

10. The apparatus of claim 1, wherein the graph-based representation of the cloud environment comprises an edge representing at least one of:
- an interconnection between a first location of the cloud environment and a second location of the cloud environment;
- an interconnection between a first element of the cloud environment and a second element of the cloud environment; or
- an interconnection between a first resource of the cloud environment and a second resource of the cloud environment.

11. The apparatus of claim 1, wherein the mapping of the cloud service to the cloud environment comprises a mapping of an element of the cloud service to at least one of a location of the cloud environment or an element of the cloud environment.

12. The apparatus of claim 1, wherein the mapping of the cloud service to the cloud environment comprises, for at least one of the information objects, a mapping of the respective information object to at least one of a location of the cloud environment or an element of the cloud environment.

13. The apparatus of claim 1, wherein, for at least one of the information objects, the respective information object comprises at least one of audio content, image content, video content, multimedia content, text-based content, or a software program.

14. The apparatus of claim 1, wherein the mapping of the cloud service to the cloud environment comprises a mapping of the cloud service virtual function of the cloud service to at least one of a location of the cloud environment or an element of the cloud environment.

15. The apparatus of claim 1, wherein the cloud service virtual function of the cloud service comprises at least one of a text processing function, an audio processing function, an image processing function, a video processing function, a multimedia processing function, an encoding function, a decoding function, an encryption function, a decryption function, a content combining function, a content splitting function, a content modification function, a network function, or a data processing function.

16. The apparatus of claim 1, wherein, to determine the mapping of the cloud service to the cloud environment, the processor is configured to:
- solve a minimum cost flow problem based on the representation of the cloud service and the representation of the cloud environment.

17. A method, comprising:
- determining, by an apparatus, a graph-based representation of a cloud service, wherein the graph-based representation of the cloud service comprises a set of nodes representing a respective set of information objects associated with the cloud service and a set of edges representing a cloud service virtual function of the cloud service, wherein the set of nodes includes a root node representing an output information object to be output by the cloud service;
- determining, by the apparatus, a graph-based representation of a cloud environment configured to host the cloud service;
- determining, by the apparatus, a mapping of the cloud service to the cloud environment based on the graph-based representation of the cloud service and the graph-based representation of the cloud environment; and
- initiating, by the apparatus based on the mapping of the cloud service to the cloud environment, configuration of the cloud environment to support the cloud service, wherein configuration of the cloud environment to support the cloud service includes allocating cloud resources of the cloud environment on physical resources of the cloud environment.

18. A non-transitory computer-readable storage medium storing instructions configured to cause an apparatus to perform at least:
- determining a graph-based representation of a cloud service, wherein the graph-based representation of the cloud service comprises a set of nodes representing a respective set of information objects associated with the cloud service and a set of edges representing a cloud service virtual function of the cloud service, wherein the set of nodes includes a root node representing an output information object to be output by the cloud service;
- determining a graph-based representation of a cloud environment configured to host the cloud service;
- determining a mapping of the cloud service to the cloud environment based on the graph-based representation of the cloud service and the graph-based representation of the cloud environment; and
- initiating, based on the mapping of the cloud service to the cloud environment, configuration of the cloud environment to support the cloud service, wherein configuration of the cloud environment to support the cloud service includes allocating cloud resources of the cloud environment on physical resources of the cloud environment.

\* \* \* \* \*